(12) United States Patent
Tetsuno et al.

(10) Patent No.: US 6,668,791 B2
(45) Date of Patent: Dec. 30, 2003

(54) CONTROL SYSTEM FOR IN-CYLINDER DIRECT INJECTION ENGINE

(75) Inventors: Masayuki Tetsuno, Hiroshima (JP); Kiyotaka Mamiya, Hiroshima (JP); Takeo Yamauchi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 49 days.

(21) Appl. No.: 10/095,090

(22) Filed: Mar. 12, 2002

(65) Prior Publication Data

US 2002/0129785 A1 Sep. 19, 2002

(30) Foreign Application Priority Data

Mar. 19, 2001 (JP) .......................... 2001-077634

(51) Int. Cl.[7] .............................. F02B 17/00; F02D 43/00
(52) U.S. Cl. ....................... 123/295; 123/301; 123/305; 123/436
(58) Field of Search .................. 123/295, 301, 123/305, 436, 457, 501, 502

(56) References Cited

U.S. PATENT DOCUMENTS 5,666,916 A * 9/1997 Fujieda et al. .............. 123/295
6,173,690 B1   1/2001 Iriya et al. .................. 123/295
6,199,534 B1   3/2001 Tokuyasu et al.
6,244,241 B1 * 6/2001 Mamiya et al. ............. 123/295

FOREIGN PATENT DOCUMENTS

| EP | 0 824 185 | 2/1998 |
| EP | 1 006 266 | 6/2000 |
| JP | 2000-204954 A | 7/2000 |
| WO | WO 01/73277 | 10/2001 |

* cited by examiner

Primary Examiner—Tony M. Argenbright
(74) Attorney, Agent, or Firm—Nixon Peabody LLP; Donald R. Studebaker

(57) ABSTRACT

In a control system for an in-cylinder direct injection engine, during idling operation, the fuel injection timing is compensated to the advance side for each cylinder so that the rate of change in crank angular velocity becomes smaller than a preset criterion while the fuel injection pressure of an injector is gradually reduced from a reference target fuel pressure to a preset lower limit. If the rate of change in crank angular speed becomes smaller than the criterion as a result of the above compensation, the fuel injection timing is compensated to the retard side so that the rate of change in crank angular velocity becomes smaller while the fuel pressure is gradually increased to the preset upper limit. Consequently, the unbalance of fuel spray and tumble due to deviations of fuel spray penetration and the like can be eliminated thereby providing suitable mixture stratification.

9 Claims, 23 Drawing Sheets

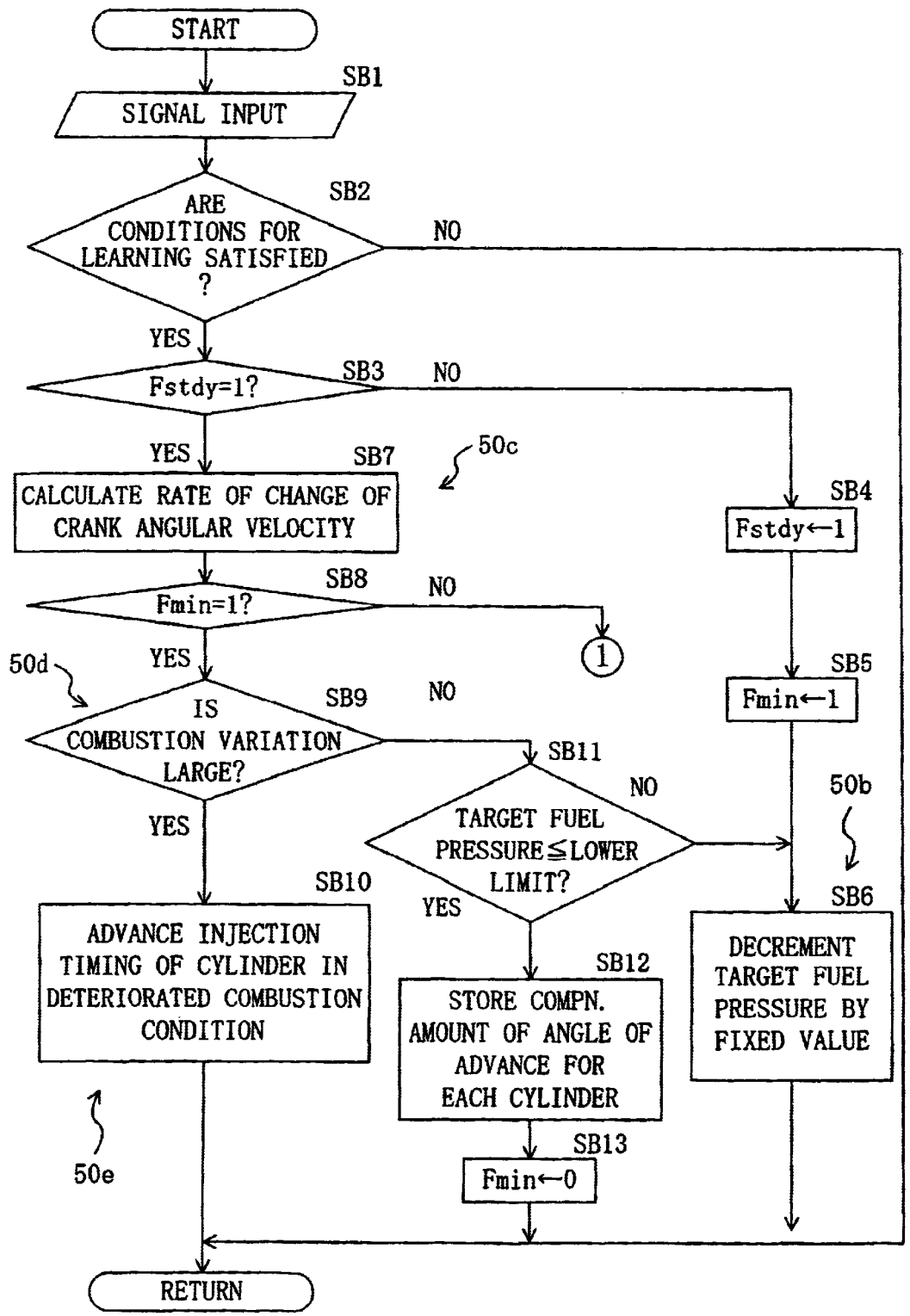

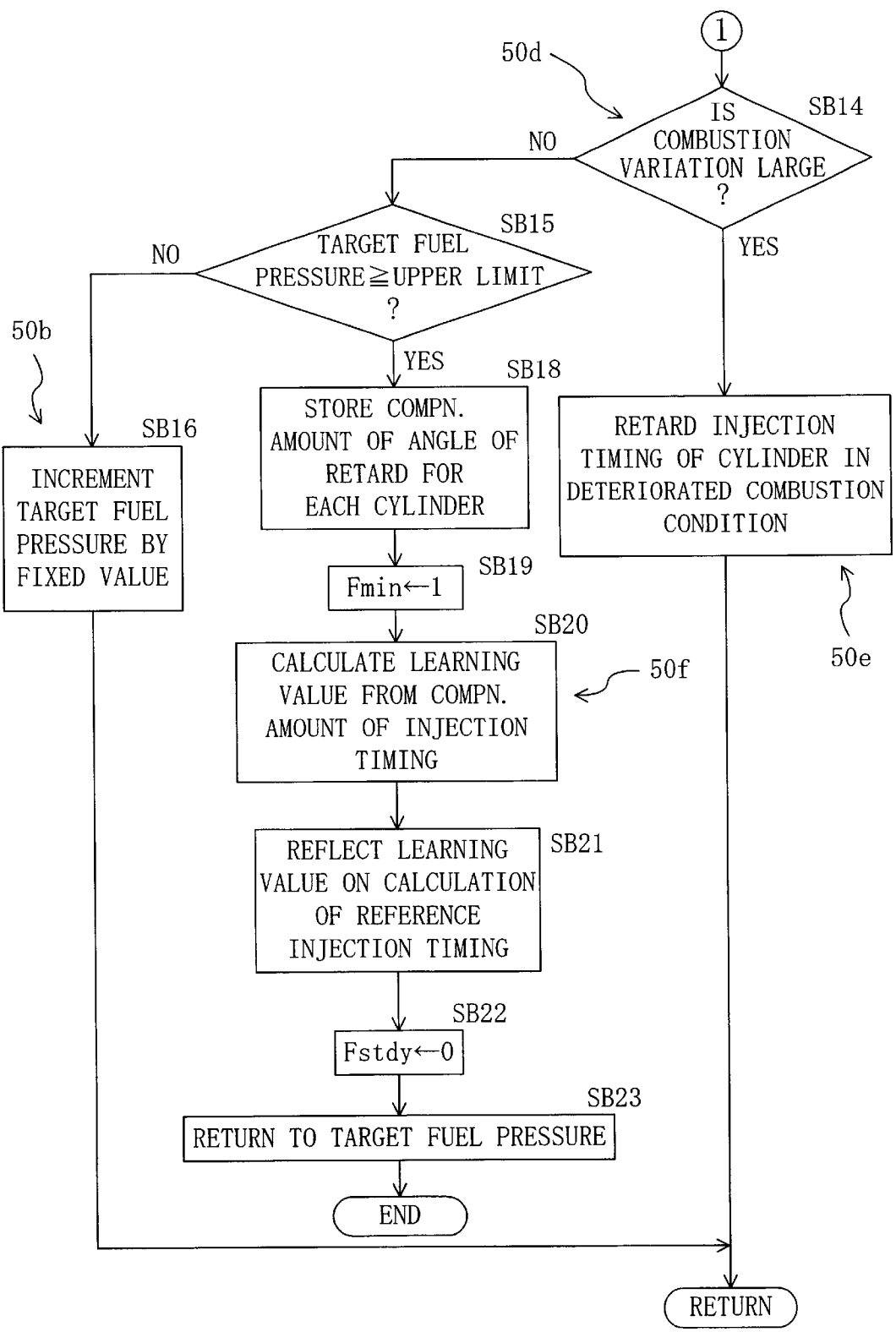

CONTROL SYSTEM FOR IN-CYLINDER DIRECT INJECTION ENGINE

BACKGROUND OF THE INVENTION (a) Field of the Invention

This invention relates to a control system for an in-cylinder direct injection engine which controls behavior of fuel spray, directly injected into a combustion chamber in a cylinder, with a tumble to combust a mixture stratified around an electrode of a spark plug, and more particularly relates to the technical field of compensation control for suppressing deterioration in combustion quality of the mixture resulting from individual differences between injectors.

(b) Description of the Prior Art

Conventionally, control systems for in-cylinder direct injection engines of this type include one which is adapted to control penetration of fuel spray from an injector in accordance with the intensity of a tumble, carry the fuel spray toward a spark plug by means of the tumble and stratify a mixture around an electrode of the spark plug, as disclosed in, for example, Japanese Unexamined Patent publication No. 2000-204954.

Specifically, in the above control system, a tumble control valve (TCV) is provided in an intake passage of the engine downstream of a throttle valve. The TCV is opened or closed by an actuator to control the intensity of the tumble in the combustion chamber. At the same time, the fuel injection pressure of the injector is correspondingly controlled so that the fuel spray penetration is balanced against the tumble. In this manner, the fuel spray from the injector is carried by means of the tumble to reach the vicinity of the electrode of the spark plug, which enables stable stratified combustion.

However, for in-cylinder direct injection engines in which a fuel is injected directly into the high-pressure combustion chamber, their injectors generally have much higher fuel injection pressures as compared with those of injectors included in so-called port injection engines, and therefore the injectors are likely to have large variations in fuel injection pressure due to their individual differences.

Further, for multi-cylinder engines such as the above-mentioned prior art (Japanese Unexamined Patent Publication No. 2000-204954), a plurality of cylinders included in a single engine have individual intake ports of slightly different shapes and therefore the combustion chambers in the cylinders are not necessarily equal to each other in tumble intensity.

Accordingly, even if the fuel injection pressures of the injectors are commonly controlled in order to change in accordance with the tumble in the above-mentioned manner, balance is not strictly offered of the fuel spray penetration and the tumble in each cylinder. This results in the inconvenience that the mixture around the spark plug is held against stratification and thereby degrades its ignitability and combustion quality.

In addition, for the multi-cylinder engines such as the prior art, the degree of unbalance of fuel spray penetration and tumble is different from cylinder to cylinder. This also incurs another problem of increasing variations in combustion from cylinder to cylinder and in particular increasing noises and vibrations (idling vibrations) due to torque variations caused during idling operation and the like.

The present invention has been made in view of the forgoing problems, and therefore its object is to provide a control system for an in-cylinder direct injection engine which enables suitable mixture stratification by controlling behavior of fuel spray by means of a tumble, and particularly to provide suitable mixture stratification by considering a deviation of fuel injection pressure of a fuel from each injector and eliminating the unbalance of fuel spray and tumble which results from the deviation.

SUMMARY OF THE INVENTION

To attain the above object, in the present invention, the fuel injection pressure of a fuel injection valve is intentionally decreased or increased so that the unbalance of fuel spray and tumble is clarified, and a fuel injection timing is compensated so that even in such a condition combustion variations of an engine can fall within an allowable range.

Specifically, as shown as an example in FIG. 1, a first aspect of the invention has as a precondition a control system A for an in-cylinder direct injection engine which includes: a fuel injection valve 18 for directly injecting a fuel into a combustion chamber 6 in a cylinder 2 of an engine 1; and a tumble generating means 10 for generating a tumble in the combustion chamber 6, in which the fuel is injected against the tumble in the combustion chamber 6 by the fuel injection valve 18 during stratified-charge combustion operation of the engine 1 so that a flammable mixture stays in the vicinity of an electrode of a spark plug 16 at the ignition timing for the cylinder 2.

Also, the control system A further includes: a fuel pressure control means 200 for controlling the fuel injection pressure of the fuel injection valve 18; a fuel pressure forcibly changing means 50b for forcibly changing the fuel injection pressure to be controlled by the fuel pressure control means 200 from a reference injection pressure corresponding to operating conditions of the engine 1; a combustion variation detecting means 50c for detecting the degree of combustion variation in the engine 1 when the fuel injection pressure has been changed by the fuel pressure forcibly changing means 50b; and an injection timing compensation means 50e for compensating the fuel injection timing of the fuel injection valve 18 so that the degree of combustion variation in the engine 1 detected by the combustion variation detecting means 50c becomes smaller than that in a preset reference condition.

First, according to part of the control system A which constitutes the precondition, the fuel is injected from the fuel injection valve 18 against a tumble generated by the tumble generating means 10 during stratified-charge combustion operation of the engine 1, and the fuel spray is reduced in speed by the tumble and thereby stratified around the electrode of the spark plug 16. In this case, if the fuel injection valves 18 have deviated fuel injection pressures due to their individual specificities, it can be expected that the fuel spray penetration is relatively weak so that the mixture may not sufficiently reach the vicinity of the spark plug 16 electrode or that contrarily the fuel spray penetration is relatively intense so that the mixture may pass over the vicinity of the spark plug 16 electrode whereby ignitability and combustion quality may be impaired.

On the other hand, according to the above-mentioned characteristic structure of the control system A, the fuel injection pressure of the fuel injection valve 18 is first changed forcibly by the fuel pressure forcibly changing means 50b, so that the deviation of penetration of fuel spray from the fuel injection valve 18 is amplified. This deteriorates ignitability and combustion quality of the mixture so that an increased degree of combustion variation of the engine 1 will be detected by the combustion variation detecting means 50c. Also, the fuel injection timing is compensated by the injection timing compensation means 50e such that even in that condition the degree of combustion variation of the engine 1 becomes smaller than that in the reference condition. In other words, for example, if the spray penetration is relatively weak, advancing the fuel injection timing allows the mixture to reach the vicinity of the spark plug 16 electrode at a suitable timing. On the other hand, if the spray penetration is relatively intense, a retarded fuel injection caused by retarding the injection timing allows the mixture to reach the vicinity of the spark plug 16 electrode at a suitable timing.

In short, according to the present invention, the unbalance of fuel spray and tumble can be eliminated by compensation for the fuel injection timing, thereby providing suitable mixture stratification. This enhances ignitability and combustion quality of the mixture thereby providing further improved fuel economy and power output performance.

In a second aspect of the invention, the control system includes a combustion variation determining means (50d) for comparing the degree of combustion variation of the engine (1) detected by the combustion variation detecting means (50c) with that in the reference condition to determine that the detected degree of combustion variation is larger than that in the reference condition, and the injection timing compensation means (50e) is adapted to compensate the fuel injection timing when the combustion variation determining means (50d) determines that the detected degree of combustion variation is larger than that in the reference condition.

With this arrangement, when the combustion variation determining means (50d) determines that the detected degree of combustion variation of the engine (1) is larger than that in the reference condition, compensation for the fuel injection timing by the injection timing compensation means (50e) provides stable mixture stratification thereby ensuring the ignitability and combustion quality of the mixture. On the other hand, if the detected degree of combustion variation is smaller than that in the reference condition, the mixture has sufficient ignitability and therefore, in this case, the injection timing will not be compensated.

In a third aspect of the invention, the engine (1) is a multi-cylinder engine having a plurality of cylinders (2), and the injection timing compensation means (50e) is adapted to compensate the fuel injection timing for each cylinder (2) of the engine (1).

Generally, in the multi-cylinder engine (1), if combustion variations between the cylinders are increased due to the unbalance of fuel spray and tumble in each cylinder (2), so-called idling vibrations may be increased so as to give the driver an uncomfortable feeling. Effects of this aspect of the invention, however, are particularly effective to such a problem.

In a fourth aspect of the invention, the fuel pressure forcibly changing means (50b) in the second aspect effects a pressure reductively changing control of changing the fuel injection pressure of the fuel injection valve (18) so that the fuel injection pressure becomes lower than a reference injection pressure and a pressure augmentatively changing control of changing the fuel injection pressure so that the fuel injection pressure becomes higher than the reference injection pressure, and the injection timing compensation means (50e) compensates the fuel injection timing of the fuel injection valve (18) to the advance side if the degree of combustion variation of the engine (1) has become larger than that in the reference condition as the result of a pressure reductively changing control of the fuel pressure forcibly changing means (50b) while compensating the fuel injection timing to the retard side if the degree of combustion variation of the engine (1) becomes larger than that in the reference condition as the result of a pressure augmentatively changing control of the fuel pressure forcibly changing means (50b).

In this case, if the fuel pressure forcibly changing means (50b) effects a pressure reductively changing control to reduce fuel spray penetration so that the degree of combustion variation of the engine (1) becomes larger, this means that the fuel spray penetration is originally deviated on a relatively weak side. Accordingly, in this case, the fuel injection timing of the fuel injection valve (18) is compensated to the advance side by the injection timing compensation means (50e), and the unbalance of fuel spray penetration and tumble can be thereby eliminated. On the contrary, if the fuel pressure forcibly changing means (50b) effects a pressure augmentatively changing control to increase fuel spray penetration so that the degree of combustion variation of the engine (1) becomes larger, this means that the fuel spray penetration is originally deviated on a relatively intense side. In this case, the fuel injection timing will be compensated to the retard side.

In a fifth aspect of the invention, the fuel pressure forcibly changing means (50b) in the fourth aspect is arranged to effect a pressure reductively changing control to gradually reduce the fuel injection pressure of the fuel injection valve (18) to a predetermined lower limit and effect a pressure augumentatively changing control to gradually increase the fuel injection pressure to a predetermined upper limit.

With this arrangement, the fuel pressure forcibly changing means (50b) first gradually changes the fuel injection pressure of the fuel injection valve (18) to the predetermined upper or lower limit, and the injection timing compensation means (50e) then effects compensation control so that even in either of the above two conditions of the fuel injection pressure the degree of combustion variation of the engine (1) becomes smaller than that in the reference condition. As a result, the unbalance of fuel spray penetration and tumble can be eliminated. In addition, in that case, since the fuel injection pressure of the fuel injection valve (18) is gradually changed to the predetermined upper or lower limit and the injection timing is gradually compensated by the injection timing compensation means (50e) in correspondence with the change of the injection pressure, it can be prevented that during the time an excessive combustion variation or a misfire occurs.

In a sixth aspect of the invention, when the combustion variation determining means (50d) determines that the detected degree of combustion variation of the engine (1) is smaller than that in the reference condition after the fuel pressure forcibly changing means (50b) in the fifth aspect has effected either one of the pressure reductively changing control and pressure augumentatively changing control, the fuel pressure forcibly changing means (50b) effects the other.

In this manner, the fuel injection pressure of the fuel injection valve (18) is first gradually changed to one of the predetermined lower and upper limits, it is confirmed in that state that the degree of combustion variation of the engine (1) is sufficiently small, the fuel injection pressure is then gradually changed to the other limit, and it is also confirmed in that state that the degree of combustion change of the engine (1) is sufficiently small. As a result, whether the fuel spray penetration for each cylinder (2) is deviated on a weak side or intense side relative to the tumble, the unbalance of them can be eliminated.

In a seventh aspect of the invention, the fuel pressure forcibly changing means (50b) and the injection timing compensation means (50e) are arranged to effect the changing of the fuel injection pressure of the fuel injection valve (18) and the compensation for the fuel injection timing, respectively, in idling operating conditions of the engine (1).

In this manner, in the idling operating conditions of the engine (1), the degree of combustion variation of the engine (1) can be accurately detected by excluding the effects of angular variations in a vehicle power transmission system and vibrations from a road surface. In addition, in the idling operation, the fuel injection timing is compensated so that combustion variations from cylinder to cylinder can be reduced, which prevents the occurrence of an uncomfortable idling vibration.

In an eighth aspect of the invention, the control system further includes an injection timing control means (50a) for controlling the fuel injection timing of the fuel injection valve (18) in accordance with operating conditions of the engine (1), and a learning control means (50f) for obtaining a learning value based on a compensated amount of the fuel injection timing by the injection timing compensation means (50e) and reflecting the learning value on the control of the injection timing control means (50a) over the fuel injection timing.

With this structure, the learning value for the compensation of the injection timing is obtained by the learning control means (50f) based on the compensated amount of the fuel injection timing by the injection timing compensation means (50e), and the learning value is reflected on the control of the injection timing control means (50a) over the reference fuel injection timing. This eliminates, in a relatively short learning time, deterioration of ignitability and combustion quality which will be induced due to deviations of the fuel spray penetration or the like in the entire stratified-charge combustion zone of the engine (1), thereby providing further improved fuel economy and power output performance of the engine (1).

In a ninth aspect of the invention, an in-cylinder direct injection engine system includes: a fuel injection valve for directly injecting a fuel into a combustion chamber in a cylinder of an engine; an intake port capable of generating a tumble in the combustion chamber; a regulator for regulating the fuel pressure of the fuel to be supplied to the fuel injection valve; a revolving speed sensor for detecting the revolving speed of the engine; a crank angle sensor for detecting the rotational angle of a crank shaft; a fuel pressure sensor for detecting the pressure of the fuel being supplied to the fuel injection valve; and a control unit for controlling the fuel injection timing and fuel pressure of the fuel injection valve based on a signal from at least one of the revolving speed sensor, the crank angle sensor and the fuel pressure sensor.

Further, the control unit is adapted to set based on at least the engine revolving speed a reference target value for control on the fuel pressure to be regulated by the regulator, set based on at least the engine revolving speed a reference target value for control on the fuel injection timing of the fuel injection valve, change the setting of the reference target value for control on the fuel pressure to increase or decrease the target value followed by controlling the regulator so that the value detected by the fuel pressure sensor reaches the changed target value, retard the fuel injection timing of the fuel injection valve behind the reference target value for control on the fuel injection timing if the rate of change of values detected by the crank angle sensor becomes larger than a preset reference value as the result of an augmentative setting of the target value for control on the fuel pressure, and advance the fuel injection timing of the fuel injection valve ahead of the reference target value for control on the fuel injection timing if the rate of change of values detected by the crank angle sensor becomes larger than the preset reference value as the result of a reductive setting of the target value for control on the fuel pressure.

With this structure, the same operations and effects as in the first, second and fourth aspects are exhibited.

As described so far, according to the first aspect of the invention, in the in-cylinder direct injection engine in which a tumble is generated in the combustion chamber of the cylinder during stratified-charge combustion operation of the engine and a fuel is injected against the tumble by the fuel injection valve so that a flammable mixture which stays in the vicinity of the spark plug electrode is ignited at the ignition timing of the cylinder, the unbalance of fuel spray and tumble can be eliminated by compensation for the fuel injection timing thereby providing suitable mixture stratification. This enhances ignitability and combustion quality of the mixture thereby providing further improved fuel economy and power output performance.

According to the second aspect of the invention, since there is provided a combustion variation determining means for comparing the degree of combustion variation of the engine detected by the combustion variation detecting means with that in the reference condition, compensation for the fuel injection timing can be further reliably effected by the injection timing compensation means when the detected degree of combustion variation is large, thereby providing stable mixture stratification.

According to the third aspect of the invention, in the multi-cylinder engine, the unbalance of fuel spray versus tumble can be eliminated so that combustion variations from cylinder to cylinder can be largely reduced, which prevents the occurrence of an uncomfortable idling vibration.

According to the fourth aspect of the invention, when the fuel injection pressure of the fuel injection valve is reduced, the unbalance of fuel spray penetration and tumble can be eliminated by compensating the fuel injection timing to the advance side through the injection timing compensation means, and when the fuel injection pressure is increased, the unbalance can be eliminated by compensating the fuel injection timing to the retard side.

According to the fifth aspect of the invention, since the fuel injection pressure of the fuel injection valve is gradually changed to the predetermined lower or upper limit, the unbalance of fuel spray penetration and tumble can be eliminated without any excessive combustion variation and misfire during the time.

According to the sixth aspect of the invention, the fuel injection pressure of the fuel injection valve is continuously changed between the predetermined lower and upper limits and the fuel injection timing is compensated correspondingly. As a result, whether the fuel spray penetration is deviated on a weak side or intense side relative to the tumble, the unbalance of them can be eliminated.

According to the seventh aspect of the invention, since the changing of the fuel injection pressure and the compensation for the fuel injection timing of the fuel injection valve are effected in idling operating conditions of the engine, this enables accurate detection of the degree of combustion variation of the engine and prevention of the occurrence of an uncomfortable idling vibration.

According to the eighth aspect of the invention, a learning value is obtained based on a compensated amount of the fuel injection timing and reflected on the control over the reference fuel injection timing, which eliminates deterioration of ignitability and combustion quality which will be induced due to deviations of fuel spray penetration or the like in the entire stratified-charge combustion zone of the engine and thereby provides further improved fuel economy and power output performance of the engine.

According to the ninth aspect of the invention, the same effects as in the fourth aspect can be obtained.

BRIEF DESCRIPTION OF THE DRAWINGS

FIG. 19 is a flow chart showing one half of a procedure for learning compensation control.

FIG. 20 is a flow chart showing another half of the procedure for learning compensation control.

DESCRIPTION OF THE PREFERRED EMBODIMENT

Hereinafter, embodiments of the present invention will be described with reference to the drawings.
(Generic Engine Structure)

Figure 1:
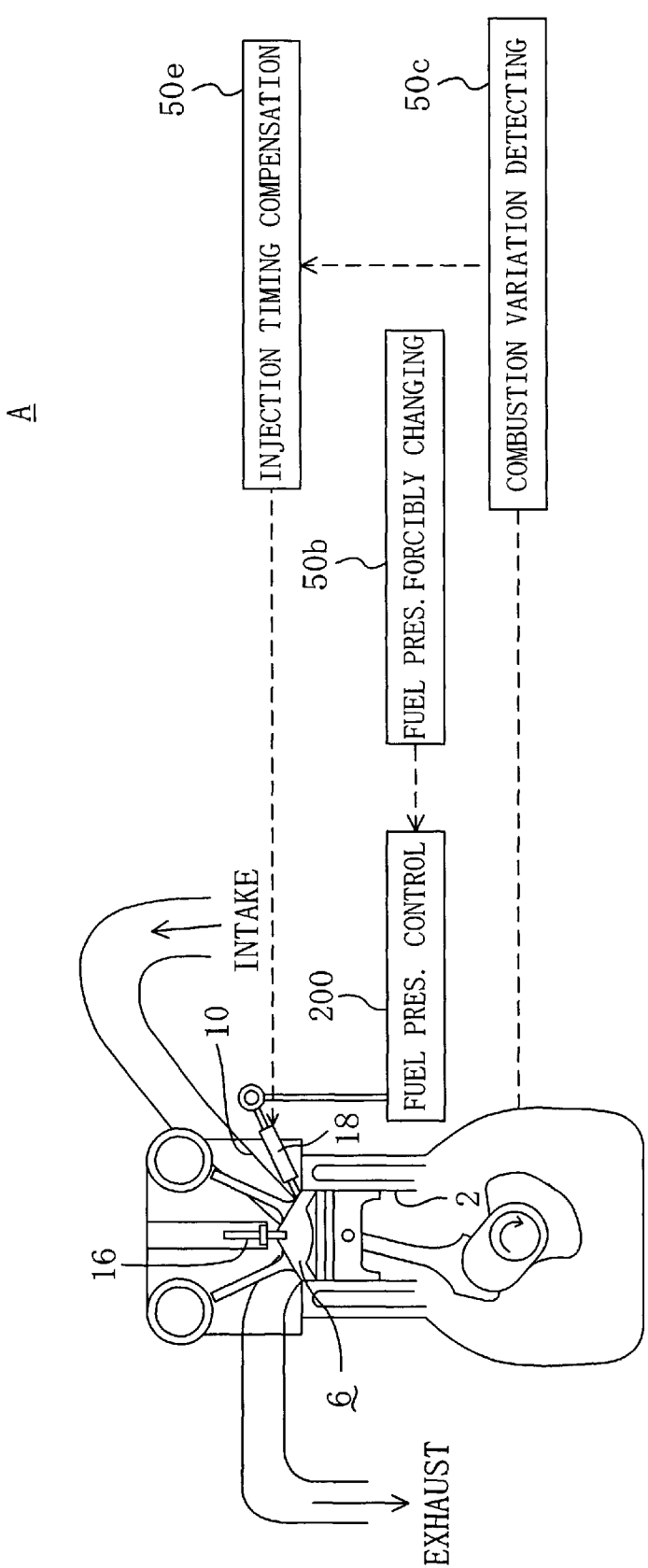
FIG. 1 is a schematic diagram showing the structure of an engine control system of the present invention.
Figure 2:
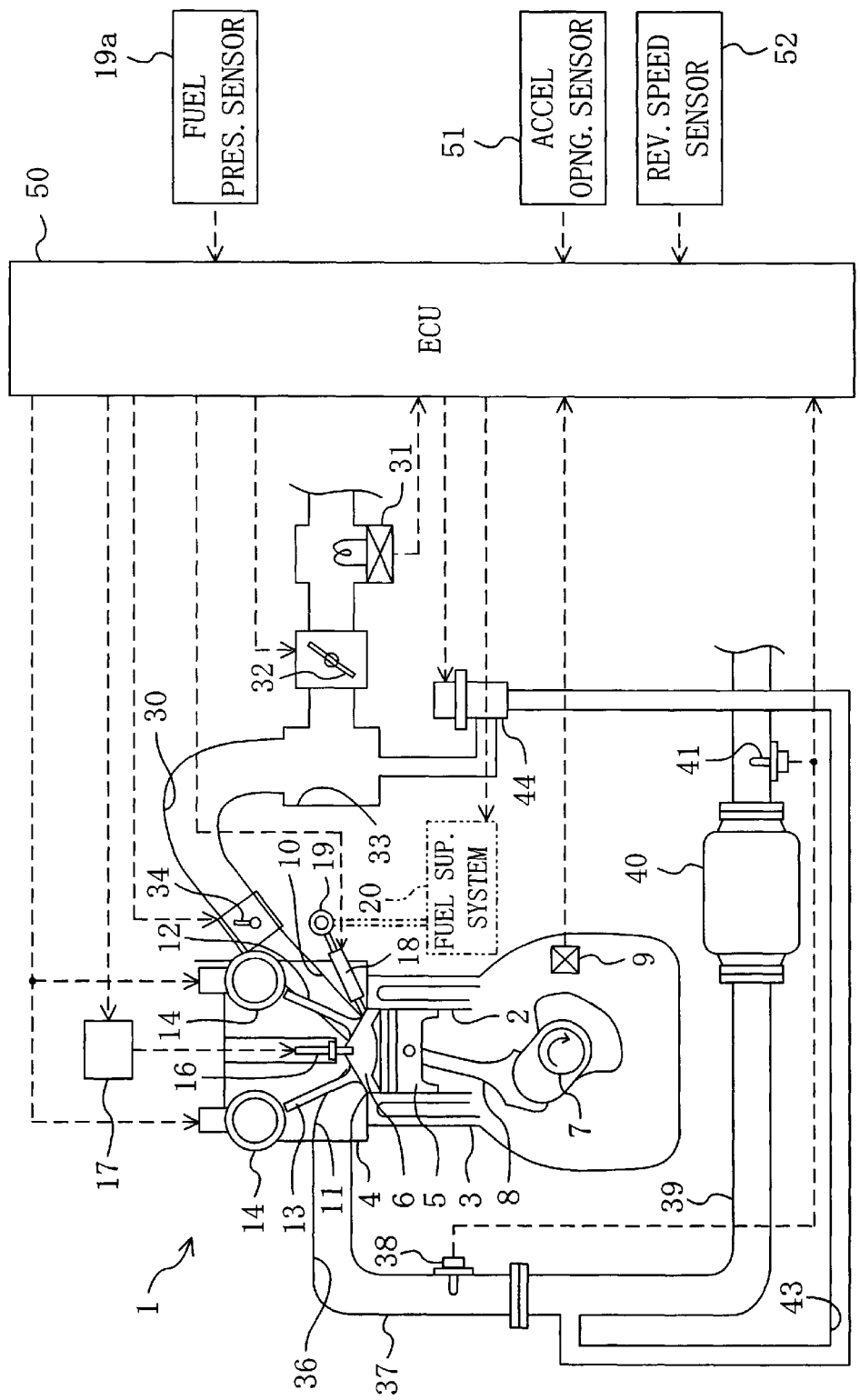
FIG. 2 is a diagram showing the generic structure of an engine according to an embodiment of the invention.

FIG. 2 shows the generic structure of an in-cylinder direct injection engine 1 according to an embodiment of the present invention. This engine 1 includes a cylinder block 3 in which a plurality of cylinders 2, 2, . . . (only one shown in the figure) are arranged in line and a cylinder head 4 disposed on the cylinder block 3. A piston 5 is fitted into each of the cylinders 2 for vertical reciprocating motion in the figure. A combustion chamber 6 is defined between the piston 5 and the cylinder head 4 in the cylinder 2. A crank shaft 7 is rotatably supported below the piston 5 in the cylinder block 3, and the crank shaft 7 and the piston 5 are connected through a connecting rod 8. At one side of the crank shaft 7, a solenoid-actuated crank angle sensor 9 is disposed for detecting the revolving angle of the crank shaft 7. Further, in a sidewall of the cylinder block 3, a water temperature sensor 15 is disposed for detecting the temperature condition of a cooling water in a water jacket inside of the cylinder block 3 (engine water temperature).

Figure 3:
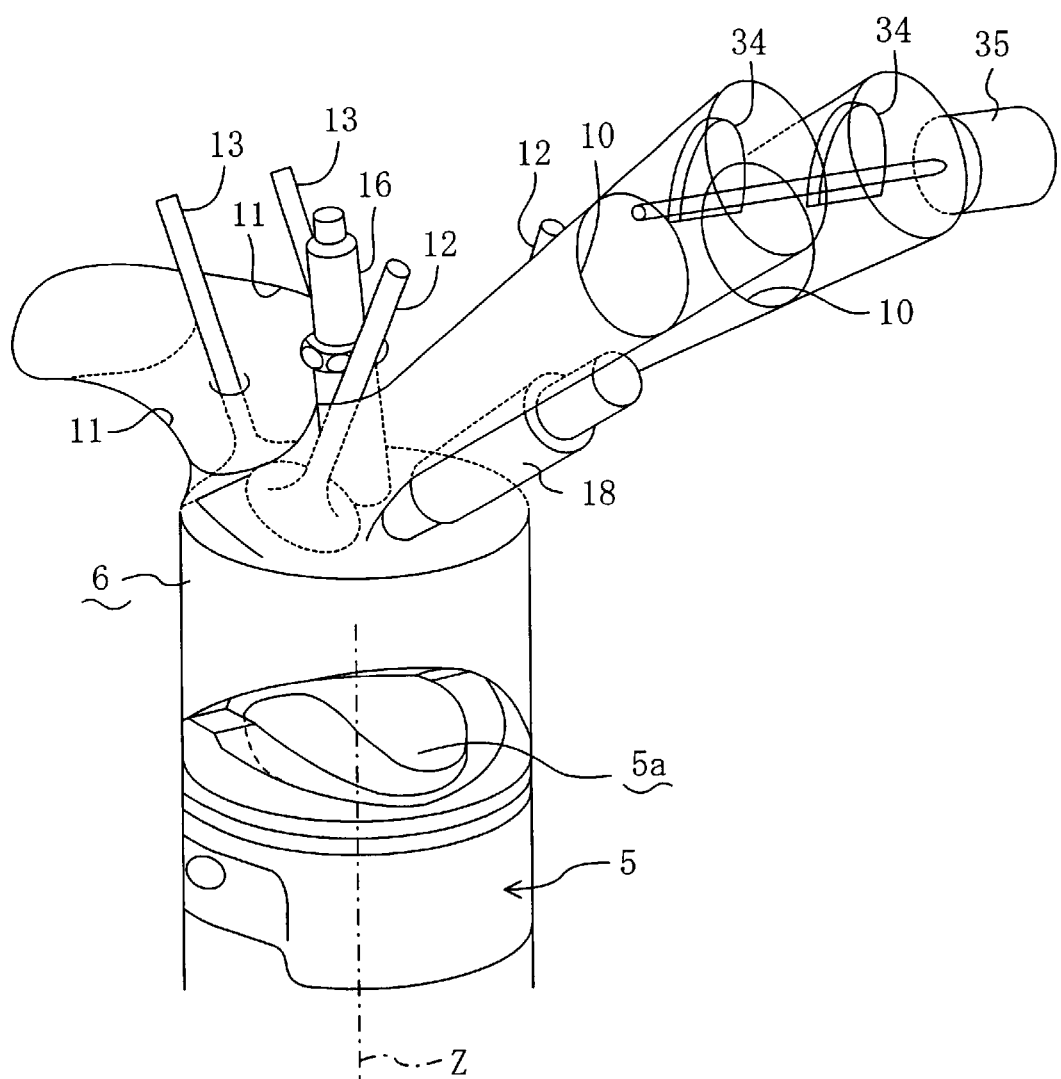
FIG. 3 is a perspective view showing the layout of a piston crown surface, an intake port, a spark plug and an injector.

As shown in FIG. 3 in enlarged dimension, the ceiling of each cylinder 2 is formed with two inclined surfaces extending substantially from its midportion to the vicinity of the lower end surface of the cylinder head 4, thereby forming a so-called "pent-roof type" combustion chamber 6 which takes on a roof-like form such that the inclined surfaces lean to each other. Two intake ports 10, 10 and two exhaust ports 11, 11 are formed in the two inclined surfaces, respectively. Intake valves 12, 12 and exhaust valves 13, 13 are disposed at the corresponding open ends of the ports. The two intake ports 10, 10 each extend straight and obliquely upward from the combustion chamber 6 and are open independently of each other on one side of the engine 1 (right-hand side in FIG. 2), while the two exhaust ports 11, 11 meet together halfway, then extend substantially horizontally and are finally open on the other side of the engine 1 (left-hand side in FIG. 2).

The intake valve 12 and the exhaust valve 13 are opened in a manner to be pressed in directions of their valve stems by two cam shafts (not shown) pivoted inside of the cylinder head 4. These cam shafts are rotated by respective timing belts in synchronism with the crank shaft 7, so that the intake valve 12 and the exhaust valve 13 can be opened and closed at respective predetermined timings for each cylinder 2. Known variable valve timing mechanisms 14, 14 each for continuously changing the phase relative to the crank shaft 7 within a predetermined range of angles are attached to the two cam shafts, respectively. The variable valve timing mechanisms 14, 14 individually changes the respective opening/closing timings of the intake valve 12 and the exhaust valve 13.

Further, as shown in FIG. 3, a spark plug 16 is disposed at an upper part of the combustion chamber 6 in each cylinder 2 so as to be surrounded by the four valves 12, 13. An electrode at the distal end of the spark plug 16 is located at a position that protrudes from the ceiling of the combustion chamber 6 by a predetermined distance. On the other hand, a firing circuit 17 (shown only in FIG. 2) is connected to the proximal end of the spark plug 16 to conduct electricity to the spark plug 16 at a predetermined ignition timing for each cylinder 2. The crown surface of the piston 5 forming the bottom of the combustion chamber 6 is provided at the midportion thereof with a lemon-shaped cavity 5a, and sidewalls of the cavity 5a have such an angular form as to correspond to the ceiling of the combustion chamber 6.

At the peripheral edge of the combustion chamber 6, an injector (fuel injection valve) 18 is disposed so as to be located below and sandwiched between the two intake ports 10, 10. This injector 18 is a known swirl injector for injecting a fuel as a swirl, through a nozzle hole located at its distal end, in the form of a hollow corn in a direction that the axis of the injector 18 extends. With this swirl injector 18, when the fuel injection pressure is increased, the penetration of fuel spray is also increased with the rise in the pressure. Generally, for the swirl injector, the penetration of fuel spray tends to become smaller as the spray cone angle is increased, while the penetration becomes larger as the spray cone angle is decreased.

Figure 4:
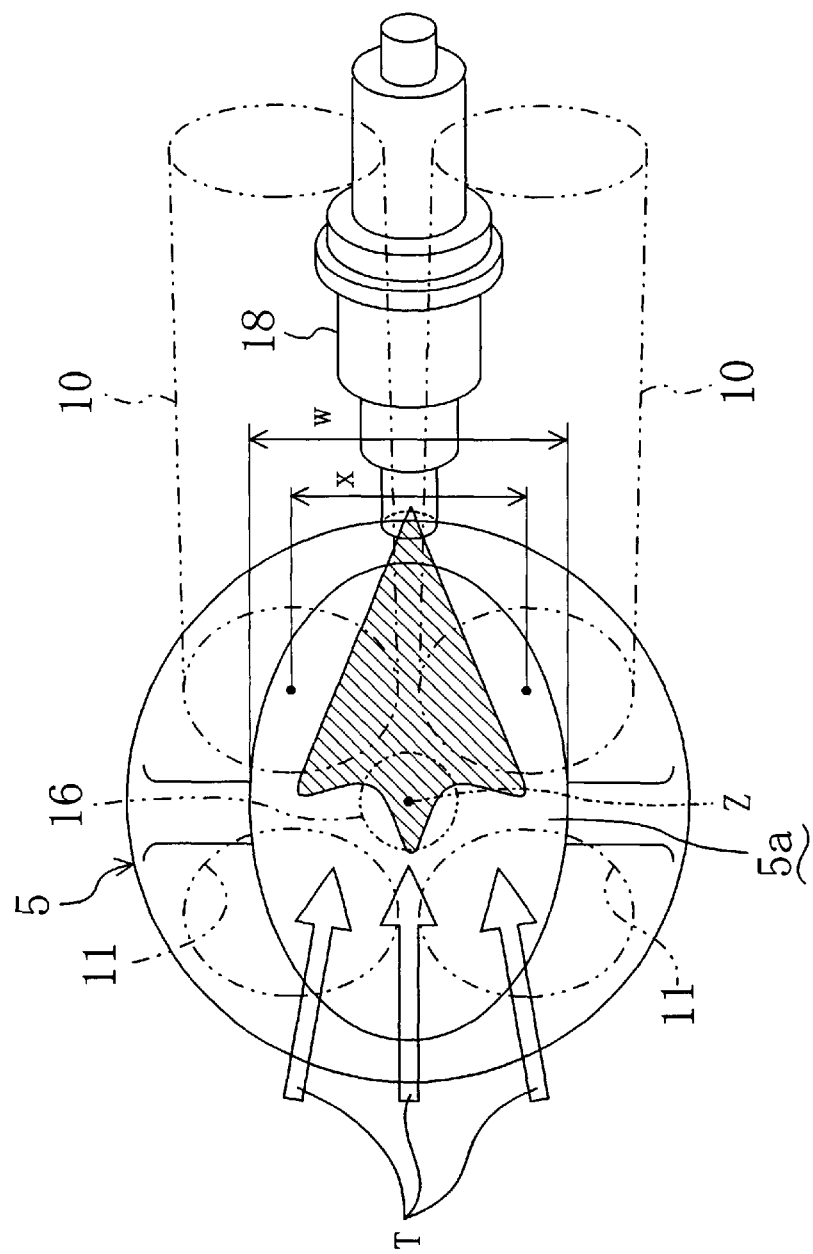
FIG. 4 is a diagram illustrating the positional relation among a cavity of the piston crown surface, a tumble and fuel spray when viewed along the center line of the cylinder.

Description will be made in further detail about the positional relation between the cavity 5a of the piston 5 crown surface and the injector 18. As shown in FIG. 4, the cavity 5a of the piston 5 crown surface is disposed so that its lengthwise direction substantially corresponds to a direction of fuel injection from the injector 18 (direction in which the center line of fuel spray extends) when viewed along the cylinder center line z. This allows a tumble T, which is generated in the combustion chamber 6 during the intake stroke of the cylinder 2 as described later, to smoothly flow along the form of the cavity 5a thereby improving the retention of the tumble T, and allows the tumble T to stably flow toward the injector 18 in a manner to envelop fuel spray.

Figure 5:
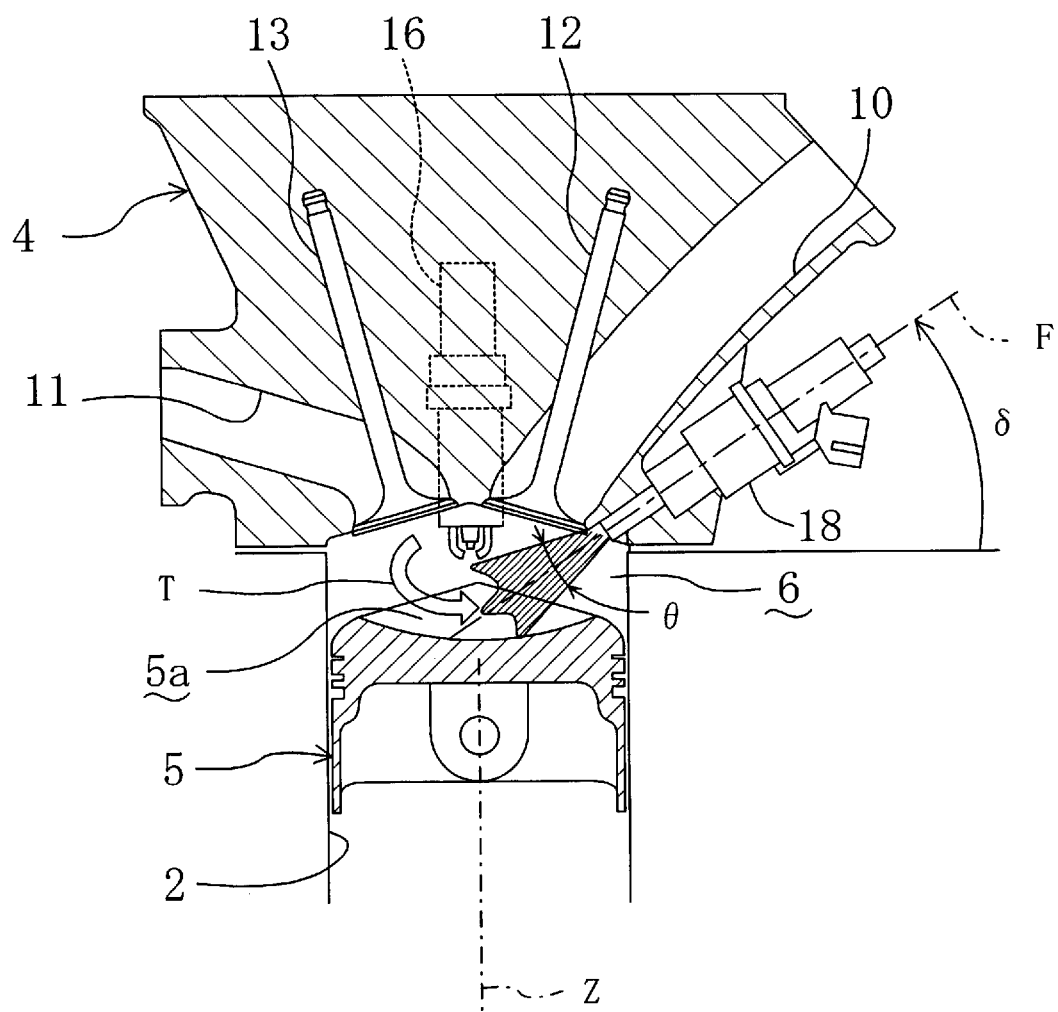
FIG. 5 is a view illustrating the center line and an exemplary spray cone angle of fuel spray from the injector.

Further, as shown in FIG. 5, the injector 18 is disposed so that its axis (corresponding to the center line F of fuel spray in this embodiment) makes a predetermined tilt angle $\delta$ (preferably, $\delta=25°$ to 50°, approximately 30° in the figure) with respect to a horizontal cross section of the cylinder 2. Further, the spray cone angle $\theta$ of fuel spray from the injector 18 generally changes depending upon the pressure conditions of the combustion chamber 6. In this embodiment, however, the spray cone angle $\theta$ of fuel spray during the compression stroke of the cylinder 2 is set to fall within a predetermined range (for example, $\theta$=about 20° to about 60°).

With the above-described layout of the injector 18, i.e., if the tilt angle $\delta$ of the spray center line F and the spray cone angle $\theta$ are set as described above, the engine 1 of this embodiment can cause fuel spray to impinge substantially oppositely against the tumble T flowing along the cavity 5a of the piston 5 crown surface at the fuel injection timing (see FIG. 11) so that behavior of the fuel spray can be controlled mainly by the tumble T thereby retaining a flammable mixture in moderate concentration condition in the middle of the combustion chamber 6, though details will be described later.

Figure 6:
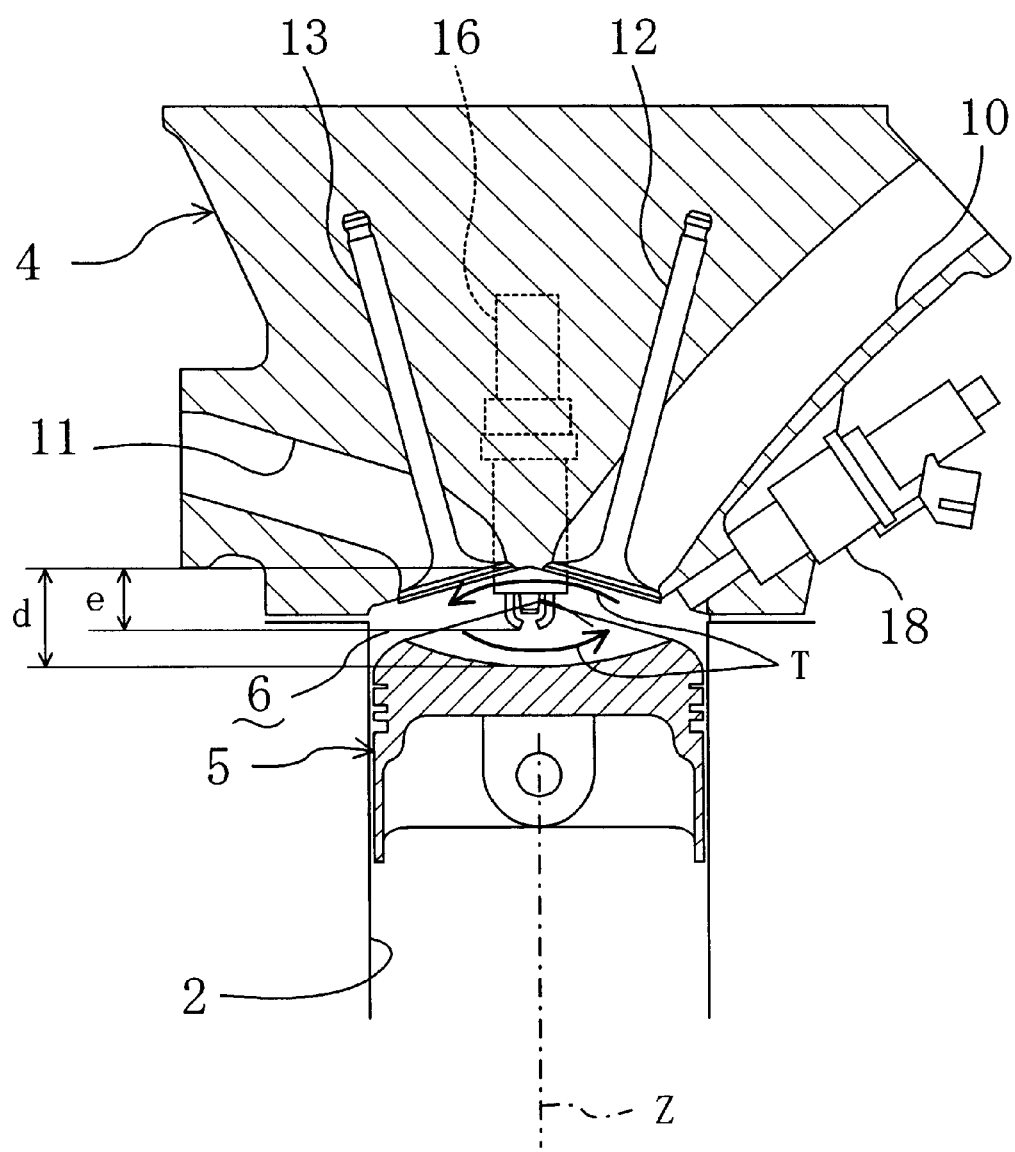
FIG. 6 is a view illustrating the positional relation between the spark plug electrode and the piston at an ignition timing for the cylinder.

Furthermore, as shown in FIGS. 5 and 6, the spark plug 16 electrode is placed to protrude by a predetermined amount from the combustion chamber 6 ceiling and along the cylinder center line z so as to be able to ignite the retained mixture with reliability. Specifically, it is assumed that at the ignition timing for the cylinder 2 (for example, at BTDC 30° CA), d is the distance on the cylinder center line z from the combustion chamber 6 ceiling to the deepest position of the cavity 5a of the piston 5. In this case, the distance e (amount of protrusion) on the cylinder center line z from the combustion chamber 6 ceiling to the spark plug 16 electrode is set at a value ranging from approximately ⅓d to approximately ⅔d. This means that the spark plug 16 electrode is located in the center of the tumble T vortex over a duration after the fuel injection timing and before the ignition timing for the cylinder 2, i.e., held in a condition that the mixture easily stays therearound.

Further, as shown in FIG. 5, in this embodiment where the fuel is injected by the injector 18 toward the piston 5 crown surface located at an obliquely downward position in the figure, it can be also said that the spark plug 16 electrode is located at a position lower than that of the injection nozzle of the injector 18 (i.e., closer to the piston 5 crown surface with respect to an extending direction of the cylinder center line z).

Figure 7A:
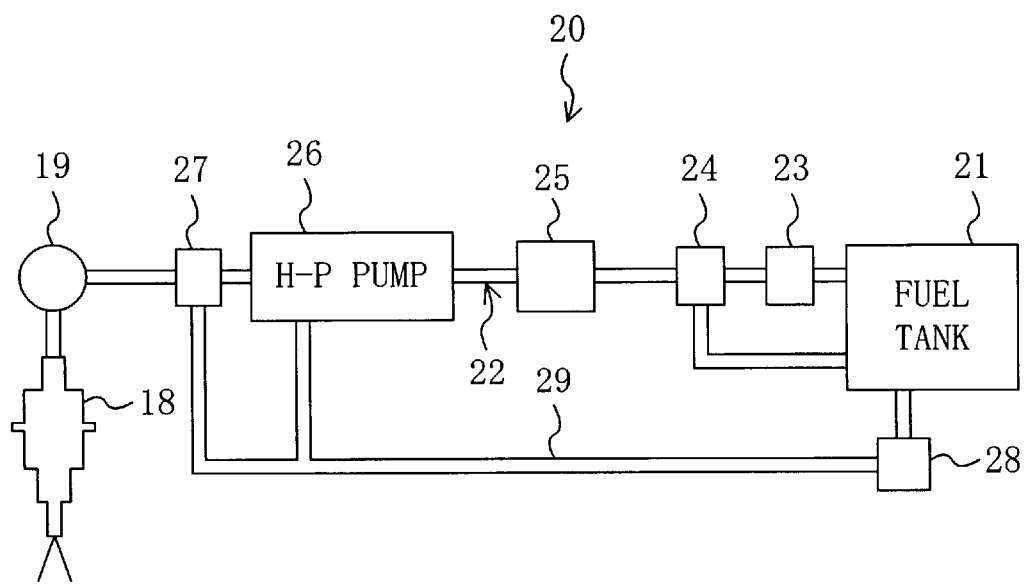
FIGS. 7A and 7B show schematic diagrams illustrating structures of fuel supply systems.

The injectors 18, 18, ... disposed for each cylinder 2 as mentioned above are connected to a fuel distributing pipe 19 common to all the cylinders 2, 2, ..., and the fuel distributing, pipe 19 is adapted to distribute a high-pressure fuel, having been supplied from a fuel supply system 20, to each cylinder 2. More specifically, the fuel supply system 20 of this engine is configured as for example shown in FIG. 7A, wherein a low-pressure fuel pump 23, a low-pressure regulator 24, a fuel filter 25, a high-pressure fuel pump 26 and a high-pressure regulator 27 are arranged in this order from upstream to downstream of a fuel passage 22 communicating between the fuel distributing pipe 19 and a fuel tank 21. The high-pressure fuel pump 26 and the high-pressure regulator 27 are connected individually to the fuel tank 21 through a return passage 29. The return passage 29 is provided with a low-pressure regulator 28 for regulating the pressure conditions of the fuel returned toward the fuel tank 21. Also, the fuel distributing pipe 19 is provided with a fuel pressure sensor 19a for detecting the pressure condition of the fuel inside of the pipe (fuel pressure).

In the fuel supply system 20, the fuel, having been pumped up from the fuel tank 21 by the low-pressure fuel pump 23, is pressure-regulated by the low-pressure regulator 24, filtered by the fuel filter 25, and then fed to the high-pressure fuel pump 26. The fuel is further raised in pressure by the high-pressure fuel pump 26 and part thereof is regulated in flow rate and supplied to the fuel distributing pipe 19. The surplus fuel is returned to the fuel tank 21 through the return passage 29. During the time, the high-pressure regulator 27 is actuated on receipt of a signal from the below-mentioned ECU 50 to regulate the flow rate of the fuel so that the detected value of the fuel pressure sensor 19a falls within a proper range (for example, substantially 3 MPa to 13 MPa, preferably 4 MPa to 7 MPa during the stratified-charge combustion operation).

Figure 7B:
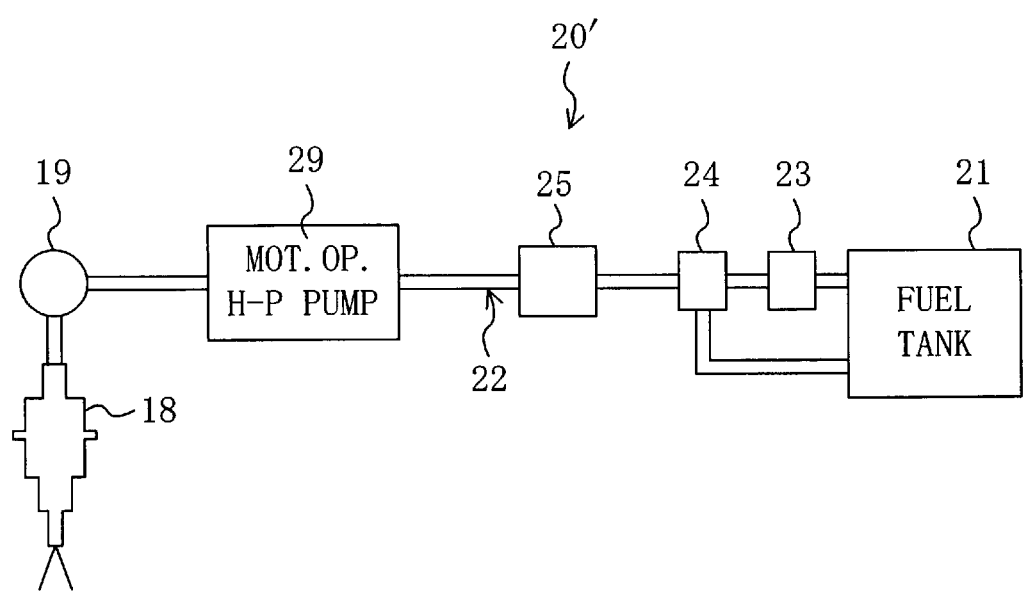

In this case, in the fuel supply system 20, the high-pressure fuel pump 26 and the high-pressure regulator 28 constitutes a fuel pressure regulating means for regulating the fuel injection pressure of the injector 18. It should be noted that the configuration of the fuel supply system 20 is not limited to the above and the high-pressure regulator 27 can be omitted from the system, as for example in the case of a fuel supply system 20' shown in FIG. 7B. In such a case, the pressure conditions of a fuel can be controlled, with the use of a motor-operated high-pressure pump 29 which has an ability to change the discharge amount of the fuel over a wide range, by variably regulating the discharge amount of the fuel flowing from the motor-operated high-pressure pump 29 toward the fuel distributing pipe 19.

As shown in FIG. 2, an intake passage 30 which communicates with the intake ports 10, 10 of each cylinder 2 is connected to one side surface of the engine 1. This intake passage 30 provides for supplying an intake air, having been filtered through an unshown air cleaner, to the combustion chamber 6 of the engine, 1, wherein an airflow sensor 31 for detecting the amount of an intake air taken into the engine 1, an electric throttle valve 32 for throttling the intake passage 30, and a surge tank 33 are disposed in this order from upstream to downstream of the intake passage 30. The electric throttle valve 32 is not mechanically connected to an unshown accel pedal and is driven into opening and closing motion to a desired opening by an unshown electric drive motor.

The intake passage 30 located downstream from the surge tank 33 is formed into independent passages branched for each cylinder 2, and a downstream end of each independent passage is further branched into two passages communicating with the respective intake ports 10, 10. On the upstream sides of both of the two intake ports 10, 10, as also shown in FIG. 3, intake airflow control valves 34 are provided for controlling the flow rate of a tumble T in the combustion chamber 6, and are actuated into opening and closing positions by, for example, a stepping motor 35 (shown only in FIG. 3). Each of the intake airflow control valves 34, 34 is formed by partly cutting away a circular butterfly valve, in this embodiment, by cutting away a portion located below from a valve stem 34a. When the intake airflow control valve 34 is closed, an intake air flows downstream from only the cut-away portion to generate an intense tumble T in the combustion chamber 6. On the other hand, as the intake airflow control valve 34 is opened, the intake air also flows through portions other than the cut-away portion so that the tumble T intensity is gradually weakened.

A tumble generating means for generating a tumble T in the combustion chamber 6 is constituted by the intake ports 11, 11. The tumble generating means can generate a tumble T flowing between the electrode of the spark plug 16 and the crown surface of the piston 5 toward the injector 18 during the compression stroke of the cylinder 2. Further, a variable tumble means which can change the flow rate of a tumble is constituted by the intake airflow control valve 34 and the stepping motor 35. It should be noted that the forms of the intake ports 10 and the intake airflow control valves 34 are not limited to those as described above. For example, the intake ports may be a so-called common port in which its flow passages are combined together on the upstream side. In this case, the form of the intake airflow control valve may be based on a butterfly valve having the form corresponding to a cross section of the common port and may be obtained by partly cutting away the butterfly valve like the first-mentioned intake airflow control valve.

An exhaust passage 36 for exhausting a burnt gas (exhaust gas) from the combustion chamber 6 is connected to the other side surface of the engine 1 in FIG. 2. The upstream end of the exhaust passage 36 constitutes an exhaust manifold 37 which is branched for each cylinder 2 and communicates with the exhaust port 11. A linear $O_2$ sensor 38 for detecting the oxygen concentration in an exhaust gas is disposed at a collecting pipe part of the exhaust manifold 37.

The linear $O_2$ sensor 38 is used for detecting the air fuel ratio based on the oxygen concentration in the exhaust gas. With this sensor, a power output linear to an oxygen concentration can be obtained within a predetermined range of air fuel ratios including the theoretical air fuel ratio.

The upstream end of an exhaust pipe 39 is connected to the confluent portion of the exhaust manifold 37, while the downstream end thereof is connected to a catalyst 40 for purifying the exhaust gas. The catalyst 40 is a NOx absorption-reduction type one for absorbing NOx in an atmosphere of an exhaust gas of high oxygen concentration while emitting absorbed NOx with decrease in oxygen concentration and reductively purifying the exhaust gas, and exhibits high exhaust gas purification performance like so-called 3-way catalytic converter particularly in the vicinity of the theoretical air fuel ratio. Further, in order to determine the deteriorating condition of the catalyst 40, a known lambda $O_2$ sensor 41 which inverts its output stepwise from the border line on the theoretical air fuel ratio is provided on the downstream side of the catalyst 40. It should be noted that 3-way catalytic converter may be additionally disposed in line with the NOx absorption-reduction type catalyst 40.

Furthermore, an upstream end of an EGR passage 43 for recirculating part of the exhaust gas flowing through the exhaust passage 36 to the intake passage 30 is connected to an upstream portion of the exhaust pipe 39. A downstream end of the EGR passage 43 is connected to the surge tank 33. In the vicinity of the EGR passage 43, an electric EGR valve 44 capable of opening control is disposed for controlling the amount of recirculation of the exhaust gas through the EGR passage 43.

Control on Engine Combustion Mode

The variable valve timing mechanism 14, the firing circuit 17 of the spark plug 16, the injector 18, the high-pressure regulator 27 of the fuel supply system 20, the electric throttle valve 32, the intake airflow control valves 34, the electric EGR valve 44 and the like are controlled in their operations by an engine control unit (hereinafter, referred to as an ECU) 50. On the other hand, the ECU 50 receives output signals from at least the crank angle sensor 9, the water temperature sensor 15, the fuel pressure sensor 19a and the airflow sensor 31, and also receives output signals from an accel opening sensor 51 for detecting the accel stroke Acc, i.e., the stepping-on measurement of an unshown accel pedal, and output signals from a revolving speed sensor 52 for detecting the revolving speed of the engine 1 (revolving speed of the crank shaft 7).

The ECU 50 controls, based on the signal input from each sensor, the valve timings of the intake and exhaust valves 12, 13, the ignition timing of the spark plug 16 for each cylinder 2, the fuel injection quantity, the injection timing and injection pressure of the injector 18, the amount of intake air regulated by the throttle valve 32, the tumble intensity regulated by the intake airflow control valves 34, the rate of exhaust gas recirculation regulated by the EGR valve 44 and the like in accordance with operating conditions of the engine 1. Thus, in the, warm conditions, the engine 1 is operated to switch between stratified-charge combustion and homogeneous combustion modes.

Figure 8:
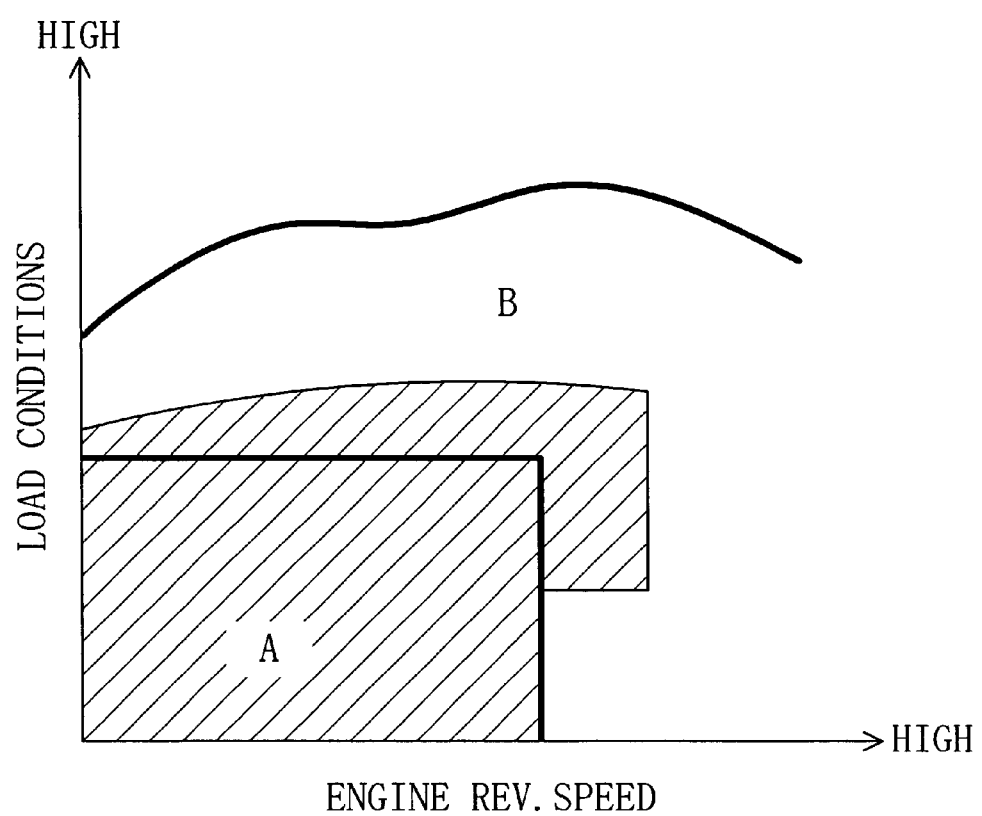
FIG. 8 is an exemplary control map in which respective operation zones where the engine is put into stratified-charge combustion and homogeneous-charge combustion modes are set.
Figure 9:
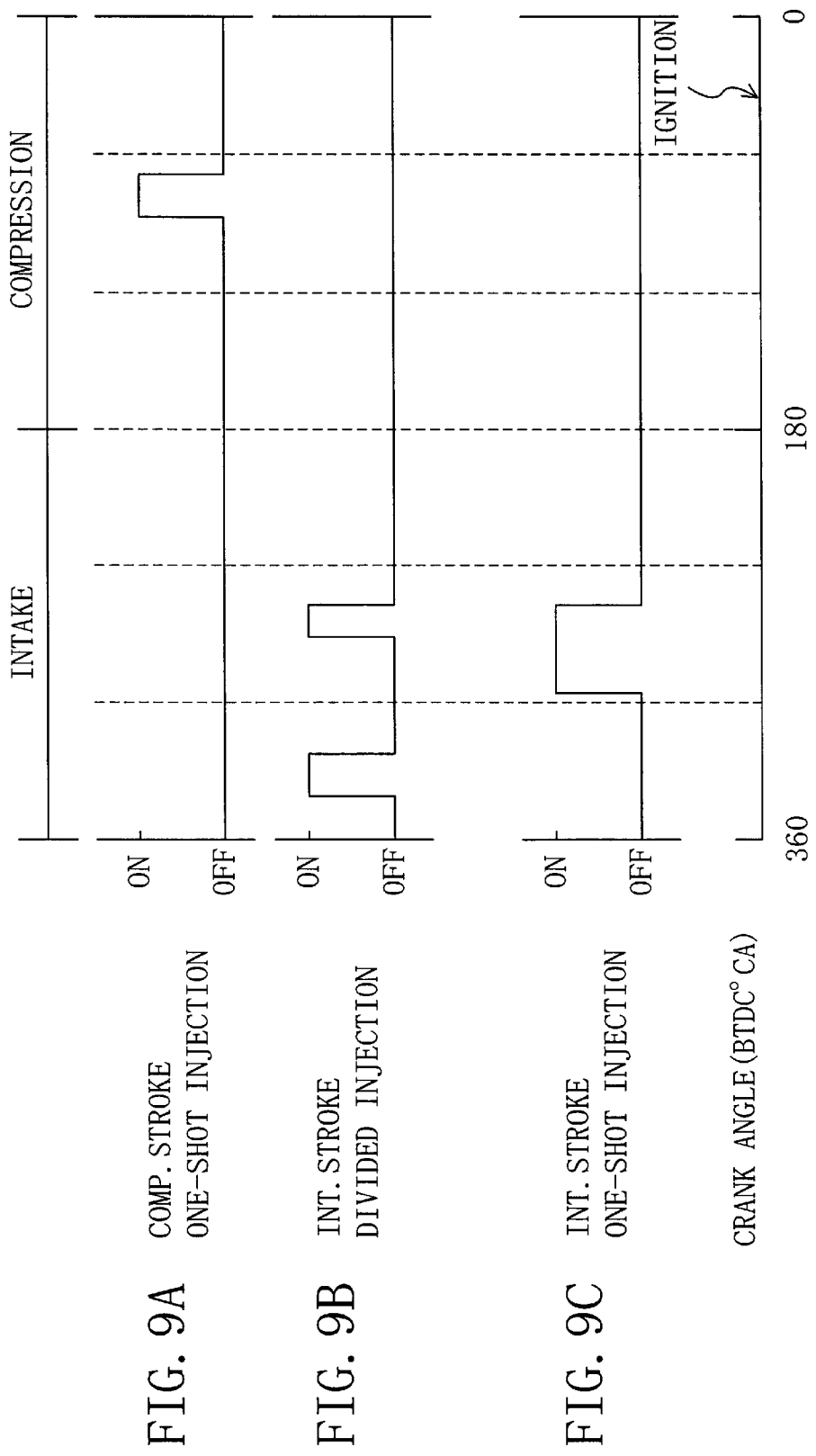
FIGS. 9A–9C are a time chart schematically showing the fuel injection timing of the injector.

More specifically, as shown as an example in FIG. 8, in the warm conditions of the engine 1, a preset operation zone A on the low-load and low-speed end is a stratified-charge combustion zone. In this zone, as schematically shown in FIG. 9A, the engine 1 falls into the stratified-charge combustion mode, in which a mixture is combusted with existing in a stratified form in the vicinity of the spark plug 6, by collectively injecting a fuel from the injector 18 during a predetermined period at the compression stroke of the cylinder 2 (for example, the range from 40° to 140° before the top dead center (BTDC) at the compression stroke). In this zone, the throttle valve 32 is set at a relatively large opening in order to reduce intake loss of the engine 1. At this time, an average air fuel ratio of the combustion chamber 6 is much leaner (for example, A/F>30) than the theoretical air fuel ratio (A/F≈14.7).

On the other hand, the zone different than the stratified-charge combustion zone A is a so-called homogeneous combustion zone B. In this zone, as schematically shown in FIGS. 9B and 9C, the engine 1 falls into a combustion mode in which a fuel is injected by the injector 18 during the intake stroke of the cylinder 2 so as to be sufficiently mixed with an intake air and a homogeneous mixture thus formed in the combustion chamber 6 is combusted. In this homogeneous combustion mode, under its almost all operating conditions, the fuel injection quantity, the throttle opening and the like are controlled so that the air fuel ratio of the mixture is substantially equal to the theoretical air fuel ratio. Particularly under near full load operating conditions, the air fuel ratio is controlled to be richer (for example, approximately A/F=13) than the theoretical air fuel ratio thereby obtaining a large power output corresponding to high load.

Further, in a region shown in oblique lines in the figure in the warm conditions of the engine 1, the EGR valve 44 is opened to recirculating part of the exhaust gas to the intake passage 30 through the EGR passage 43. At this time, the opening of the EGR valve 44 is controlled in accordance with the load conditions and revolving speeds of the engine I at least so that the rate of exhaust gas recirculation (hereinafter, also referred to as the EGR rate) is smaller at higher load. In this manner, production of NOx can be suppressed by the recirculated exhaust gas without impairing combustion stability of the engine 1.

For example, the rate of amount of exhaust gas recirculated to the intake passage 30 through the EGR passage 43 relative to the amount of fresh air may be used as the EGR rate. As employed herein, the fresh air refers to the outside air calculated by excluding the recirculated exhaust gas, the fuel gas and the like from the air taken in the cylinder 2. Further, in the cold conditions of the engine 1, to give top priority to ensuring combustion stability, the engine 1 is operated in the homogeneous combustion mode over the entire range of operating conditions and the EGR valve 44 is held fully closed.

Figure 10:
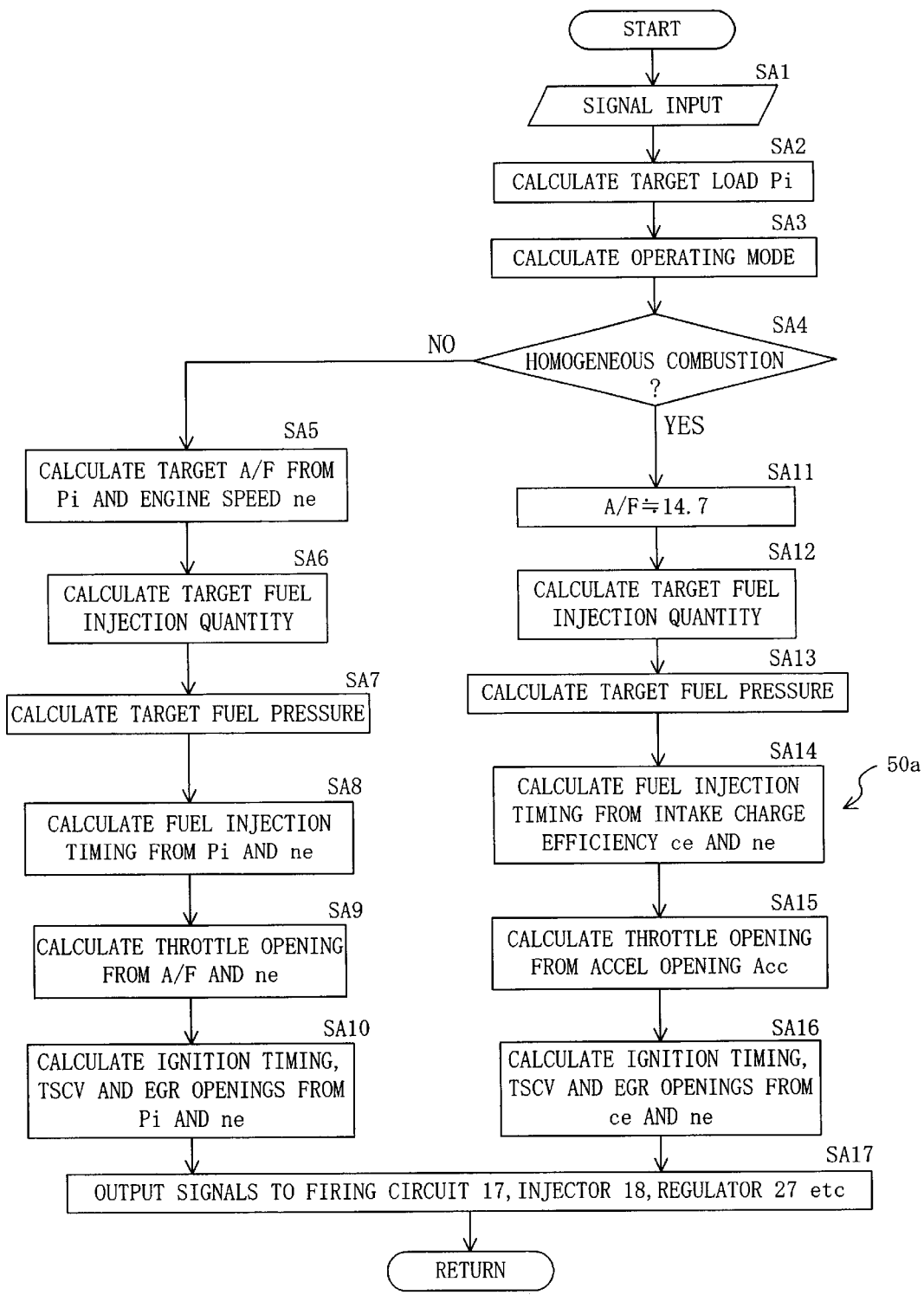
FIG. 10 is a flow chart showing a basic control procedure for the engine.

The control procedure of the ECU 50 for the injector 18 and the like is substantially as shown in a flow chart of FIG. 10. As shown in the figure, when the program starts, the ECU 50 inputs output signals from the crank angle sensor 9, the water temperature sensor 15, the airflow sensor 31, the accel opening sensor 51, the revolving speed sensor 52 and the like in Step SA1. Subsequently, in Step SA2, the target load Pi for the engine 1 is calculated based on the engine revolving speed ne detected by the revolving speed sensor 52 and the accel opening Acc detected by the accel opening sensor 51. To determine the target load Pi, optimal values corresponding to respective accel openings Acc and engine revolving speeds ne are previously calculated and recorded as a map, the map is electronically stored in a memory of the ECU 50, and the value of the target load Pi corresponding to the current accel opening Acc and current engine revolving speed ne is read out of the map.

Then, in Step SA3, the operating mode of the engine 1 is read out of the control map as shown in FIG. 8 based on the calculated target load Pi and the engine revolving speed ne and set (Calculate Operating Mode). In the subsequent steps from Step SA4 to Step SA17, control parameters are calculated individually in a manner that the calculation made separately between the cases of the stratified-charge combustion mode and the homogeneous combustion mode, and the injector 18, the throttle vale 32 and the like are actuated based on the calculation results. Specifically, if the determination in Step SA4 is NO indicating that the engine 1 is not in the homogeneous combustion mode, then the engine 1 is in the stratified-charge combustion mode and therefore the program proceeds with Step SA5. In this step, the target air fuel ratio A/F of the engine 1 is calculated based on the target load Pi and the engine revolving speed ne. Also for the target air fuel ratio A/F, its optimal values corresponding to target loads Pi and engine revolving speeds ne are previously experimentally determined and recorded as a map in the memory of the ECU 50. Therefore, the target air fuel ratio corresponding to the current target load Pi and current engine revolving speed ne is read out of the map.

Then, in Step SA6, a target fuel injection quantity is calculated based on the calculated target air fuel ratio A/F and an intake charge efficiency ce, and a valve open time (pulse width) of the injector 18 is also calculated based on the target fuel injection quantity and a fuel pressure detected by the fuel pressure sensor 19a. It should be noted that the intake charge efficiency ce is calculated based on an output of the airflow sensor 21 and the engine revolving speed ne.

Subsequently, in Step SA7, a target fuel pressure is calculated based on the engine revolving speed ne. This target fuel pressure is a reference fuel injection pressure corresponding to the current operating conditions of the engine 1. In this embodiment, its optimal values corresponding to respective engine revolving speeds ne are previously experimentally determined and recorded as a table, and the table is stored in the memory of the ECU 50. Therefore, the value of the target fuel pressure corresponding to the current engine revolving speed ne is read out of the table.

Then, in Step SA8, a valve open start timing of the injector 18, i.e., a fuel injection timing, is calculated based on the target load Pi and the engine revolving speed ne. The fuel injection timing is a reference value corresponding to the current operating conditions of the engine 1. Its optimal values corresponding to respective target loads Pi and engine revolving speeds ne are previously experimentally determined and recorded as a map. Therefore, the value of the fuel injection timing corresponding to the current target load Pi and current engine revolving speed ne is read out of the map. It should be noted that the reference fuel injection timing is set in association with the ignition timing of each cylinder 2 so that a mixture is suitably stratified around the spark plug 16 at the ignition timing of each cylinder 2, though it is more fully described later.

Next, in Step SA9, a target opening of the throttle valve 32 is calculated based on the target air fuel ratio A/F and the engine revolving speed ne. Also for this throttle opening, its optimal values are previously experimentally determined and recorded as a map, and the target opening value corresponding to the current target air fuel ratio A/F and current engine revolving speed ne is read out of the map. In this case, the correspondence between the throttle opening and both of the target air fuel ratio A/F and the engine revolving speed ne varies depending upon the existence or absence of recirculated exhaust gas. Therefore, separate maps are prepared for the cases of recirculating or not recirculating an exhaust gas, and the target throttle opening is read out of either map.

Then, in Step SA10, control parameters for the spark plug 16, the intake airflow control valve 34 (TSCV) and the EGR valve 44 are determined. Specifically, the ignition timing and the target openings of the intake airflow control valve 34 and the EGR valve 44 are each calculated based on the target load Pi and the engine revolving speed ne. Also for each of these parameters, optimal values corresponding to respective target loads Pi and revolving speeds ne of the engine 1 are previously experimentally obtained and recorded as a map, and each parameter is calculated by reading the value corresponding to the current target load Pi and current engine revolving speed ne from the map.

On the other hand, if the determination in Step SA4 is YES indicating that the engine 1 is in the homogeneous combustion mode, the program proceeds with Step SA11 in which the target air fuel ratio is set at a predetermined value. This value is A/F=14.7 under almost all engine operating conditions, but A/F=13 under near full load operating conditions. Subsequently, in Step SA12, the target fuel injection quantity is calculated as in Step SA6 and the valve open time of the injector 18 (pulse width) is determined based on the calculated target fuel injection quantity.

Then, in Step SA13, the target fuel pressure is calculated based on the engine revolving speed ne as in Step SA7. Subsequently, in Step SA14, the valve open start timing of the injector 18, i.e., the fuel injection-timing, is calculated based on the intake charge efficiency ce and the engine revolving speed ne. Next, the target opening of the throttle valve 32 is calculated based on the accel opening acc in Step SA15, and the ignition timing and the target openings of the intake airflow control valve 34 and EGR valve 44 are calculated based on the intake charge efficiency ce and the engine revolving speed ne in Step SA16.

Next to Step SA10 or Step SA16, the program proceeds with Step SA17 in which signals as actuating instructions are output to the firing circuit 17, the injector 18, the high-pressure regulator 27 of the fuel supply system 20, the drive motor for the throttle valve 32, actuators for the intake airflow control valve 34 and the EGR valve 44, and then the program returns.

In the above control flow, the control parameters for the injector 18 are first calculated and the control parameters for the throttle valve 32, the firing circuit 17 and the like are then calculated. However, the order of calculations for these parameters is not limited to the above. Alternatively, calculations for those parameters may be made in parallel.

In the above-mentioned basic control flow, Steps SA8 and SA14 constitute an injection timing control means 50a for controlling the fuel injection timing of the injector 18 in accordance with operating conditions-of the engine 1.

Fuel Injection Pressure Control During Stratified-Charge Combustion Operation

For the engine 1 of this embodiment, in the above-mentioned stratified-charge combustion mode of the engine 1, suitable mixture stratification is provided by controlling behavior of fuel spray having been injected from the injector 18 during the compression stroke for each cylinder 2, by a tumble T in the combustion chamber 6.

Figure 11:
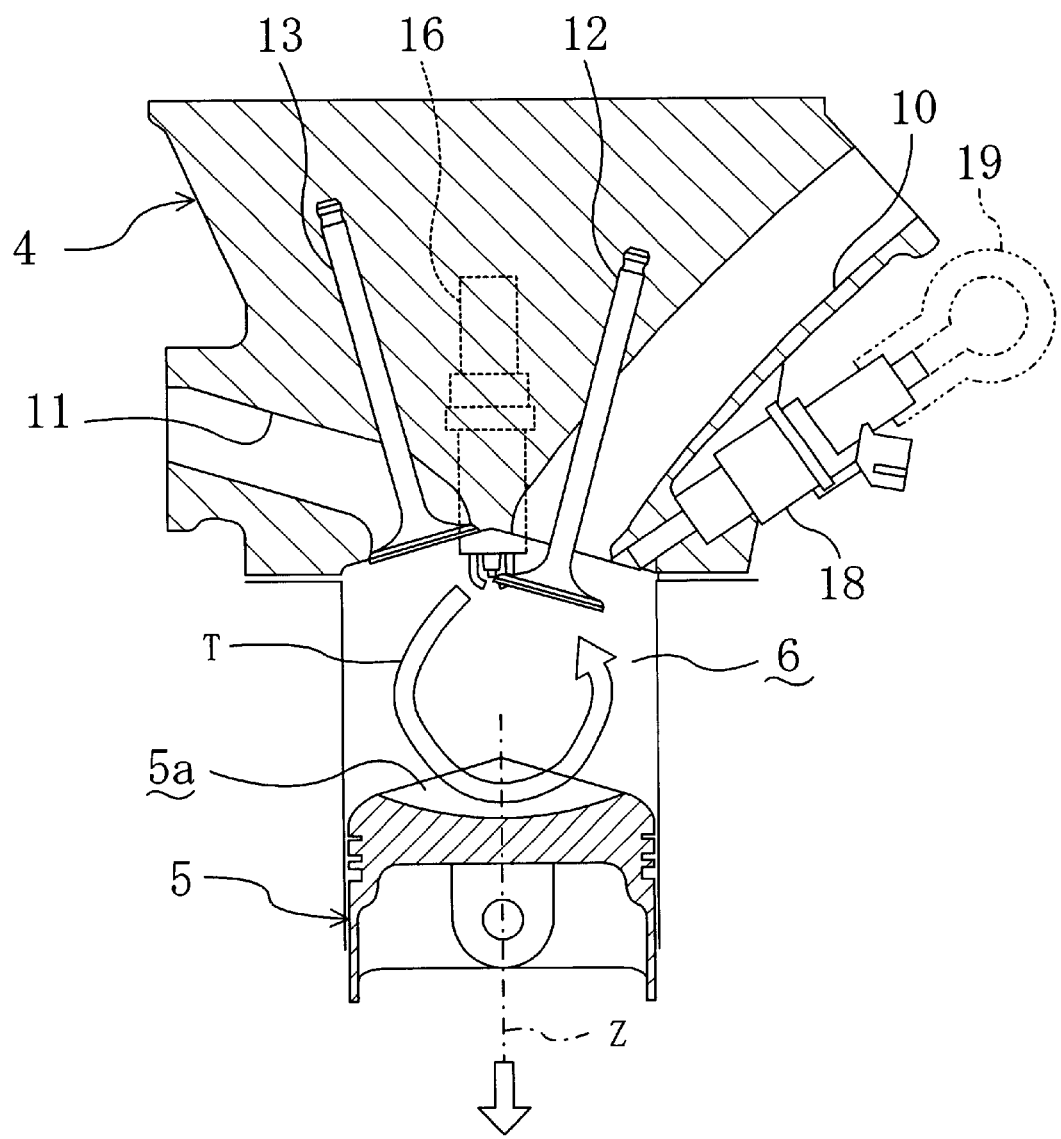
FIG. 11 is a view showing how the tumble is generated in the combustion chamber at an intake stroke of the cylinder.
Figure 12:
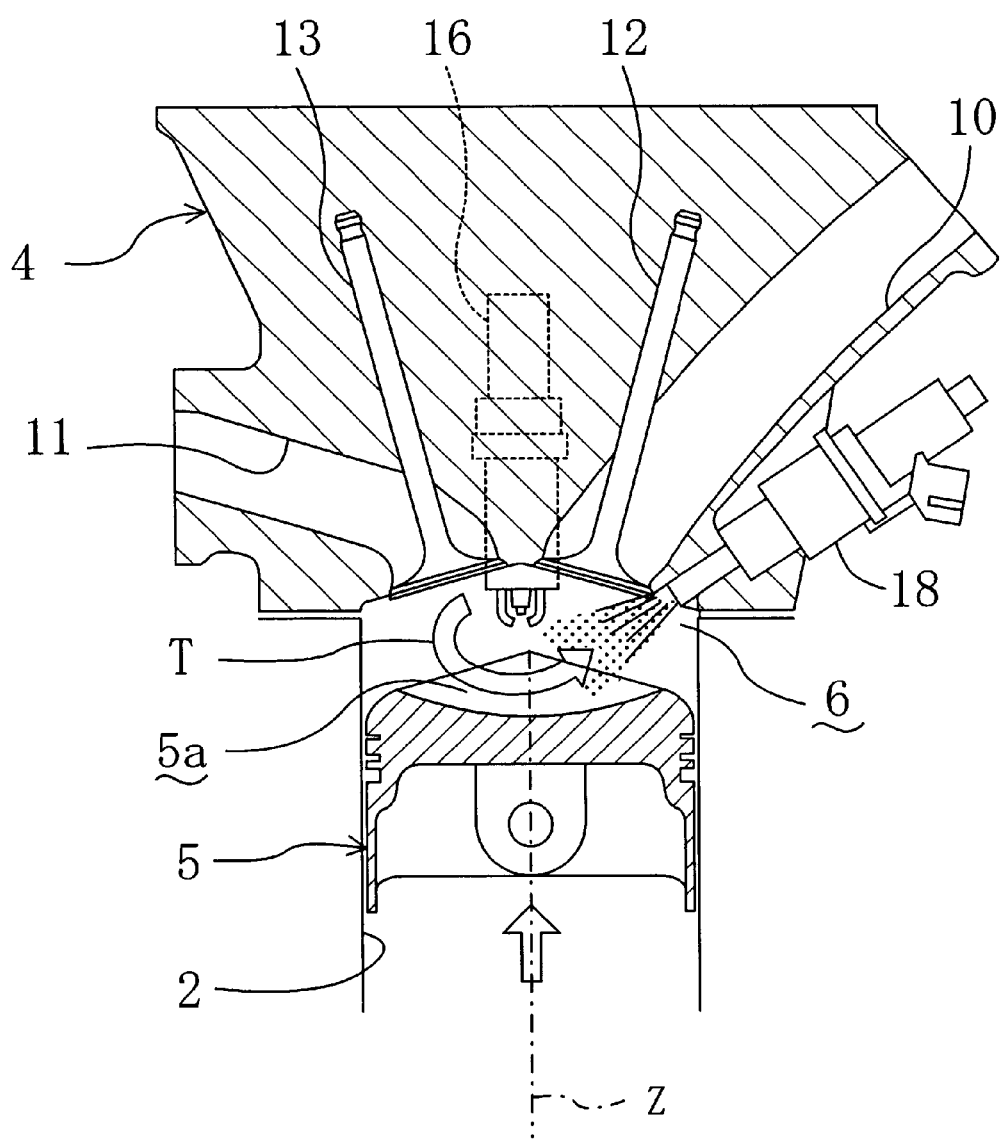
FIG. 12 is a view showing a state of fuel spray injected to impinge against the tumble at the fuel injection timing for the cylinder.

This point will be described below in detail. First, at the intake stroke of each cylinder 2, a tumble T is generated by an intake air flowing into the combustion chamber 6 through the intake ports 10, 10 as shown in FIG. 11. As shown in FIG. 12, this tumble T is retained up to the late stage of the compression stroke of the cylinder 2 and flows along the cavity 5a of the piston 5 crown surface toward the injector 18. In this state, when a fuel is injected by the injector 18 to impinge substantially oppositely against the tumble T with a suitable penetration, the fuel spray travels toward the spark plug 16 while being gradually reduced in speed by the tumble T. During the time, fuel droplets are carbureted and mixed with the air so that a flammable mixture is formed and retained in the vicinity of the spark plug 16 electrode at the ignition timing for the cylinder 2 as shown in oblique lines in FIG. 13.

Figure 14:
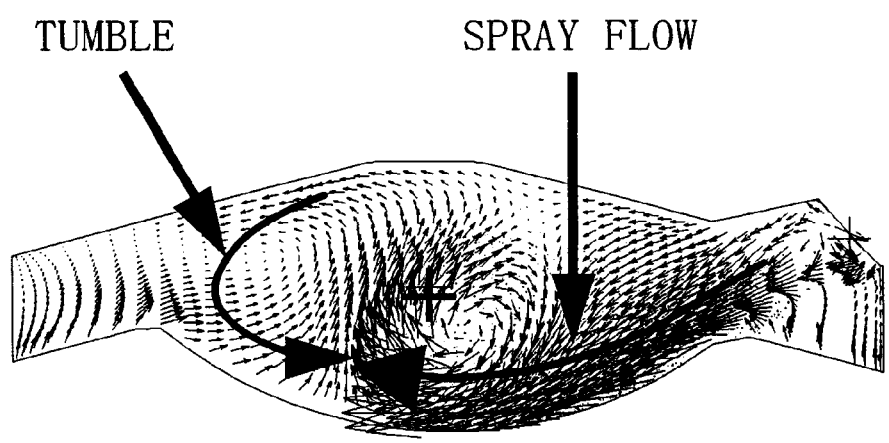
FIG. 14 is a view showing the result of a CFD analysis of flow distribution where the tumble and the fuel spray are substantially balanced one against another in a combustion chamber.
Figure 15A:
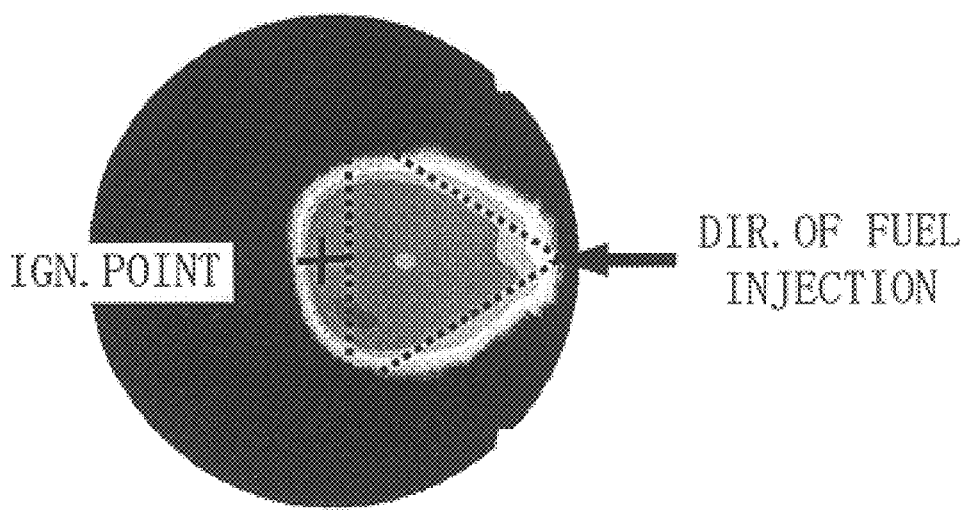
FIGS. 15A and 15B show states of a mixture formed in the vicinity of the spark plug electrode.
Figure 15B:
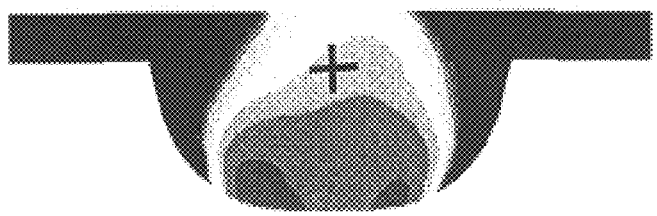

The flow distribution of the combustion chamber 6 near to the ignition timing for the cylinder 2 will be as for example shown in FIG. 14. This figure shows the result of analysis of the flow distribution of the combustion chamber 6 through the application of CFD (computational fluid dynamics). As shown in bold arrows in the figure, the tumble and spray flow travel from both lateral sides to middle of the figure along the piston crown surface, and they impinges one against another in the vicinity of the spark plug electrode represented in + mark in the figure. Then, as for example shown in FIG. 15, a flammable mixture mass of suitable concentration can be retained around the spark plug 16 electrode (ignition point) near to the ignition timing for the cylinder 2. Accordingly, for this engine 1, penetration of fuel spray from the injector 18 is controlled in accordance with the flow rate of the oppositely flowing tumble, and a fuel is injected at a predetermined timing inversely calculated from the ignition timing of the cylinder 2. In this manner, a mixture can be suitably and stably stratified around the spark plug 16 electrode.

Meanwhile, since the flow rate of the tumble in the combustion chamber generally changes with the engine revolving speed, if the mixture will be suitably stratified using a tumble in the above-described manner, penetration of fuel spray from the injector should be controlled in accordance with the change in the tumble flow rate. Specifically, as shown in solid and imaginary lines in FIG. 16A, when the engine 1 is in the stratified-charge combustion zone A and its revolving speed ne is equal to or smaller than a set value ne* (for example, 3500 rpm), the flow rate of the tumble becomes higher as the engine revolving speed ne increases. For this reason, in this embodiment, the fuel injection pressure of the injector 18 is changed in accordance with the change in the tumble flow rate as described above, thereby changing fuel spray penetration as shown in FIG. 16B. That is, when the engine revolving speed ne is equal to or smaller than the set value ne*, fuel spray penetration is enhanced in accordance with the rise in the revolving speed ne.

Figure 16B:
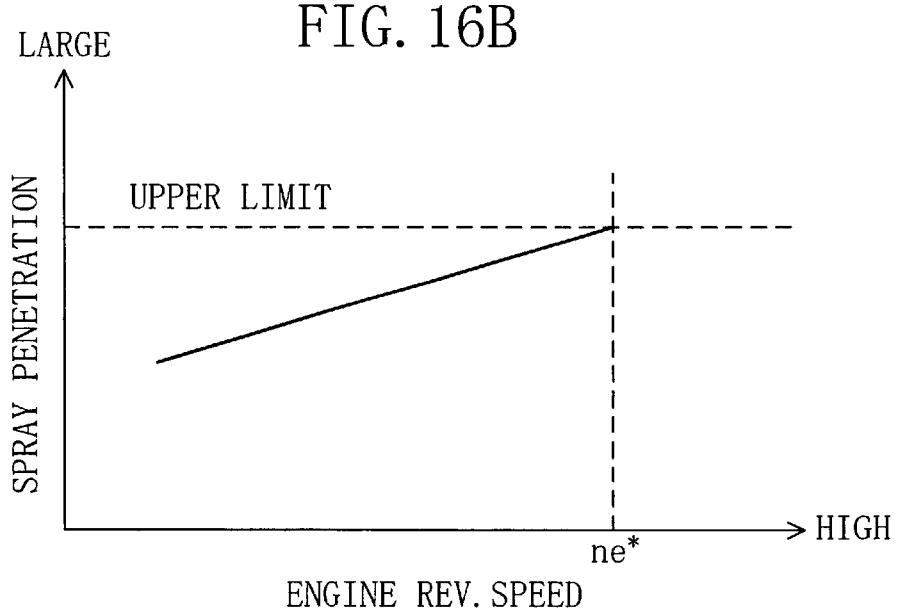
Figure 17:
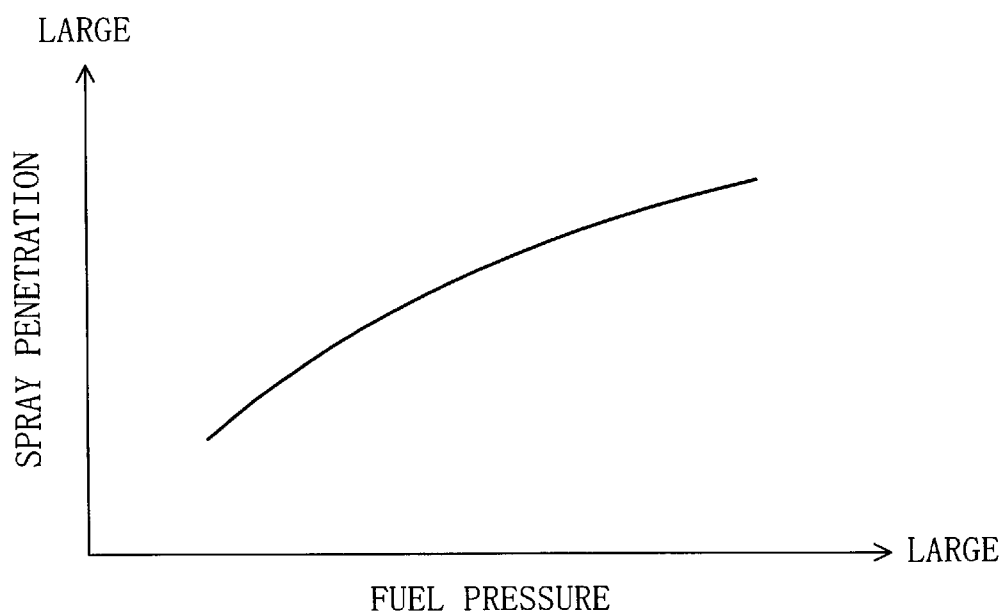
FIG. 17 is a map showing the relation between the fuel spay penetration and the fuel injection pressure.

Such control on fuel spray penetration is based on that the pressure of fuel to be supplied to the injector 18 for each cylinder 2 (fuel pressure) is changed by operation control of the ECU 50 over the high-pressure regulator 27 of the fuel supply system 20. A relationship as shown in FIG. 17 is established between the fuel pressure and the fuel spray penetration. Therefore, in the actual control procedure, the fuel pressure will be regulated, in consideration of the relationship of FIG. 17, so that the relationship between the engine revolving speed ne and the fuel spray penetration is as shown in FIG. 16B.

Figure 16A:
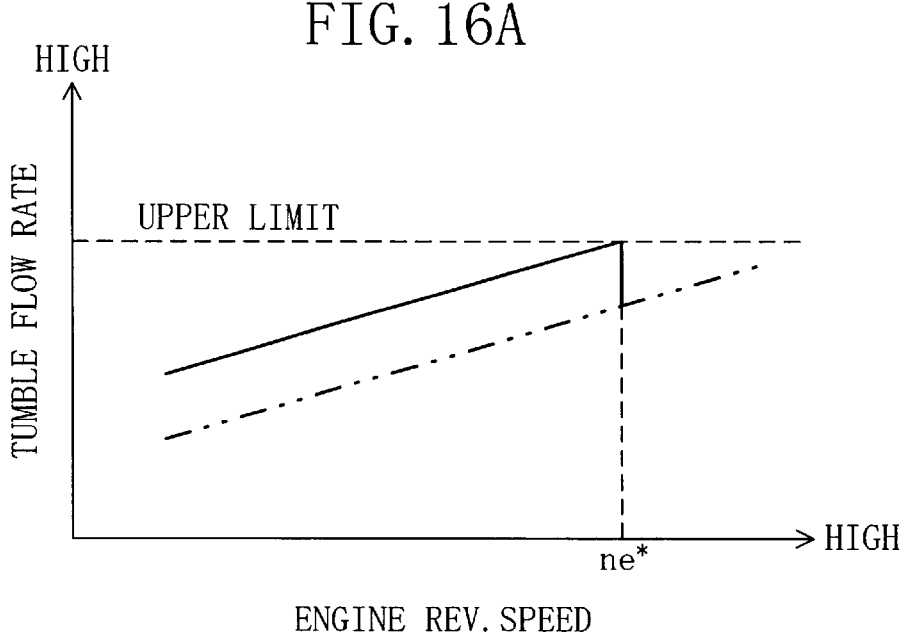
FIGS. 16A and 16B show graphs respectively showing the change in the flow rate of the tumble and the penetration of fuel spray in accordance with the engine revolving speed.

It should be noted that the opened position of the intake airflow control valve 34 is shown in the imaginary line in FIG. 16A and the closed position thereof is shown in the solid line in the same figure. In other words, in this embodiment, the intake airflow control valve 34 is arranged so that it is fully closed in order to raise the tumble flow rate in the stratified-charge combustion zone A while it is fully opened in order to ensure the intake air amount in the homogeneous combustion zone B.

Learning Compensation Control on Inter-Cylinder Combustion Variation

In general, injectors for engines are different from each other in errors that will be produced when they are processed and assembled (i.e., the injectors have individual differences), and therefore they vary in fuel injection quantity and fuel injection pressure. In particular, for in-cylinder direct injection engines like this embodiment, their fuel injection pressures are much higher than those of port injection engines, and therefore their fuel injection quantities and fuel injection pressures are likely to vary largely. In addition, since the multiple-cylinder engine has intake ports of slightly different shapes from cylinder to cylinder, the tumble conditions are not necessarily homogenized among all the cylinders.

Figure 18A:
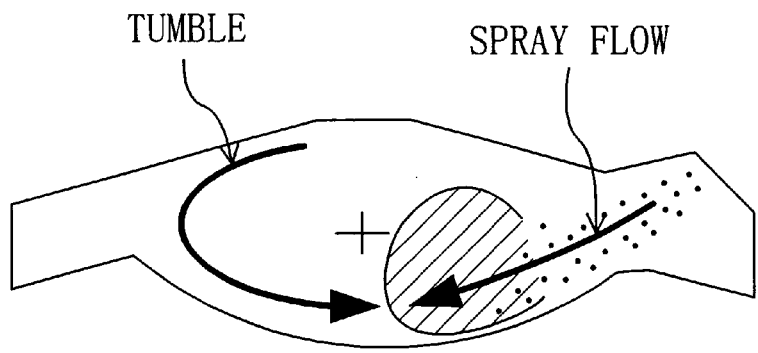
FIGS. 18A and 18B illustrate both states of a mixture where a fuel spray condition is relatively weak and intense, respectively.

As can be seen from these points, even if the fuel injection pressures of the injectors 18 is set at a common value in order to accord with the flow rate of the tumble T in the above manner, the penetration of fuel spray from the injector 18 in each cylinder 2 is not actually balanced against the flow rate of the tumble T, which results in the inconvenience that a mixture cannot be stratified as desired around the spark plug 16 electrode to deteriorate its ignitability and combustion quality. Specifically, for example, when the penetration of fuel spray from the injector 18 is relatively weaker than the intensity of the tumble, the impingement point between them at the ignition timing of the cylinder 2 is located, as schematically shown in FIG. 18A, closer to the injector 18 than the spark plug electrode (indicated in + mark in the figure). As a result, as shown in oblique lines in the figure, a mixture mass does not reach the vicinity of the spark plug 16 electrode so that the ignitability and combustion quality may be impaired.

Figure 18B:
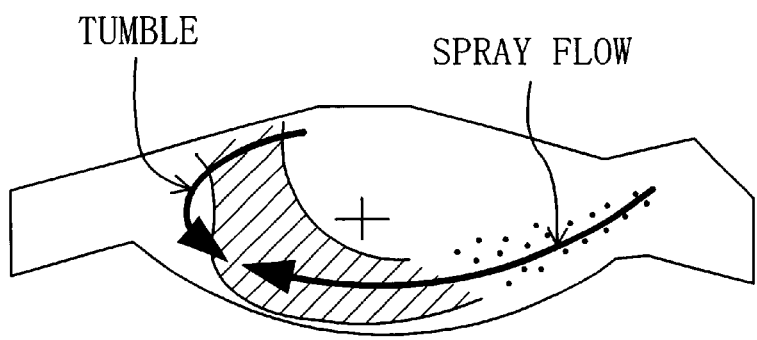

In contrast, when the penetration of fuel spray is relatively more intense, the impingement point between the tumble and the fuel spray at the ignition timing of the cylinder 2 is located, as shown in FIG. 18B, on the side opposite from the injector 18 with respect to the spark plug electrode (left side of the figure). In this case, a mixture mass may pass over the spark plug 16 electrode to diffuse on the exhaust gas side of the combustion chamber 6.

In addition, such mixtures having different ignitabilities and combustion qualities in the cylinders 2 increase combustion variations from cylinder to cylinder. Therefore, particularly at low engine speeds such as during engine idling operation, vibrations and noise due to torque variations of the engine 1 are excessive, which may give the driver an uncomfortable feeling.

To cope with the above problems, in the engine control system A of this embodiment, a deviation of the fuel spray penetration or the like in each cylinder 2 is first eliminated by compensation for the fuel injection timing. Next, a learning value for the deviation is obtained based on the compensated amount of the injection timing, and then reflected on the control on a reference injection timing over the entire stratified-charge combustion zone A of the engine 1, which eliminates deviations of the fuel spray penetration or the like over the entire zone A thereby providing suitable mixture stratification.

Hereinafter, a specific procedure for compensation control will be descried based on flow charts shown in FIGS. 19 and 20. First, as shown in FIG. 19, when the program starts, the control system A inputs output signals from the crank angle sensor 9, the water temperature sensor 15, the fuel pressure sensor 19a, the accel opening sensor 51, the revolving speed sensor 52 and the like in Step SB1. Subsequently, in Step SB2, it is determined whether conditions for executing a learning compensation control are satisfied. If the engine 1 has not yet been in the warm-up conditions and therefore the determination is NO indicating that the conditions for executing a learning compensation control are not satisfied, the program returns. On the other hand, if the engine 1 has already been in the idling conditions past the warm-up conditions and therefore the determination is YES indicating that the conditions for executing a learning compensation control are satisfied, the program proceeds with Step SB3.

In Step SB3, it is determined whether a learning execution flag Fstdy indicating that a learning compensation control is in execution is set (Fstdy=1?). If the determination is YES, this means that the learning compensation control is already in execution and therefore the program proceeds with the below-described Step SB7. On the other hand, if the determination is NO, the program proceeds with Step SB4 in which the learning execution flag is set (Fstdy←1), and then in Step SB5, a fuel pressure lower limit sweep flag Fmin is set which indicates this is the case where the fuel injection pressure of the injector 18 should be forcibly decreased (pressure reductively changing control). Thereafter, the program proceeds with Step SB6 in which the target value of the fuel injection pressure of the injector 18, i.e., the target value of the fuel pressure to be regulated by the fuel supply system 20 (target fuel pressure), is decremented by a predetermined fixed value, and then returns.

In other words, in this compensation control, the fuel injection pressure of the injector 18 in each cylinder 2 is first forcibly decreased from the reference target fuel pressure so that a deviation of the fuel spray penetration of the injector 18 on a weaker side is intentionally amplified. In this manner, a combustion variation of the engine 1 becomes larger as described later and therefore it can be easily detected.

In Step SB7 after it has been determined in Step SB3 that the learning compensation control is in execution (the determination is YES), the rate of change of the rotational angular velocity of the crank shaft 7 is calculated based on a signal from the crank angle sensor 9. Subsequently, in Step SB8, it is determined whether the fuel pressure lower limit sweep flag Fmin is set (Fmin=1?). If the determination is NO indicating that the flag Fmin is not set, the program proceeds with Step SB14 in the flow of FIG. 20. On the other hand, the determination is YES indicating that the flag Fmin is set, the program proceeds with Step SB9. In Step SB9, it is determined, based on the rate of change of the angular velocity obtained in Step SB7, whether the degree of combustion change of the engine 1 exceeds a predetermined reference condition, in other words, whether the combustion condition of any of cylinders 2, 2, . . . of the engine 1 is deteriorated over a predetermined level.

Figure 21:
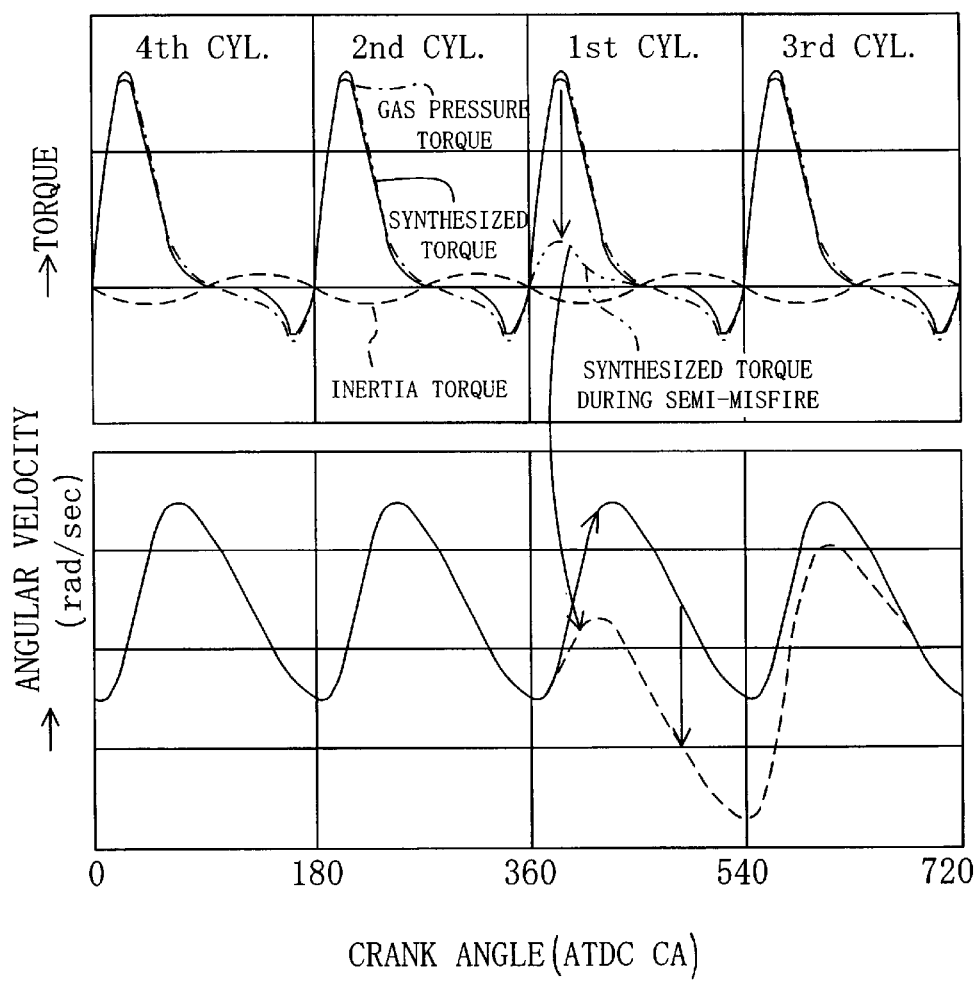
FIG. 21 shows strokes of cylinders in a four-cylinder four-cycle engine, and respective changes in torque and angular velocity with the change in crank angle.

Here, a combustion variation of the engine will be described. For example in straight-type four-cylinder four-cycle engines, as shown as an example in FIG. 21, combustion is made one time in each of the first to fourth cylinders during a single combustion cycle formed of intake, compression, expansion and exhaust strokes. In the graphs of FIG. 21, the abscissas indicate the crank angle (CA) and the ordinates indicate the torque and angular velocity, respectively. As shown in a bold solid line in the upper graph of FIG. 21, during normal combustion, synthesized torque of torque derived from an inertia force of each cylinder 2 of the engine 1 (inertia torque) and torque derived from an in-cylinder pressure including combustion (gas pressure torque) periodically changes at time intervals of 180 degrees. As shown in the lower graph of FIG. 21, the angular velocity (a solid line) of the crank shaft 7 rotated by the above synthesized torque also periodically changes.

On the other hand, for example, if the combustion condition in the first cylinder is largely deteriorated, the synthesized torque of the engine is largely decreased as shown in a dash-double-dot line in the figure. As a result, the crank angular velocity is also decreased remarkably from the middle stage of the expansion stroke of the first cylinder (as shown in a dash line) so that the difference from that during normal combustion is increased. Further, in the next cylinder (third cylinder), the angular velocity is decreased in the first half of the expansion stroke in which effects of the previous cylinder still remain, but it gradually approaches the value in the normal state as the stroke is further advanced.

As described so far, it has been known that a correlation exists between combustion variation and rate of change of the crank angular velocity in each cylinder 2 and that the correlation becomes closer in the range from the crank angle at which combustion substantially ends in either one of the cylinders to the crank angle at which combustion starts in the next cylinder. Accordingly, for example, if the angular velocity in a predetermined range of crank angles such as the above-mentioned range can be detected for each cylinder of the engine, the combustion condition of the cylinder in question can be accurately determined based on the rate of change of the angular velocity.

In this respect, in Step SB9, determination is made of whether the rate of change of the angular velocity thus obtained is more than a predetermined criterion (preset value corresponding to a reference condition). If the determination is NO, i.e., if the combustion condition is not deteriorated in every cylinder 2, 2, . . . and a combustion variation of the engine 1 is smaller than the reference condition, the program proceeds with Step SB11. On the other hand, if the determination is YES, i.e., if the combustion condition is deteriorated over the predetermined level in either one of the cylinders 2, 2, . . . , the program proceeds with Step SB11 in which the fuel injection timing of the cylinder 2 in deteriorated combustion condition is advanced by a predetermined angle of advance (fixed value), and then returns.

Namely, if the penetration of fuel spray is intentionally decreased by reducing the fuel injection pressure of the injector 18 so that a certain cylinder 2 deteriorates its combustion condition, it can be understood that the penetration of fuel spray in the cylinder 2 of concern has originally been deviated on a weaker side and therefore a mixture mass will not reach the vicinity of the spark plug 16 electrode at the ignition timing of the cylinder 2 as shown in FIG. 18A. Accordingly, in such a case, advancing the fuel injection timing of the injector 18 provides improved ignitability and combustion quality.

Further, if the determination in Step SB9 is NO, the program proceeds with Step SB11 in which it is determined whether the current target fuel pressure is less than a predetermined lower limit (preset lower limit). If the determination is YES, this means that the fuel injection pressure of the injector 18 is sufficiently reduced to ensure that a combustion variation can be detected and therefore further reduction in the fuel pressure is not necessary. Accordingly, the program proceeds with Step SB12. On the other hand, if the determination is NO, the program proceeds with Step SB6 in which the target fuel pressure is decreased by another fixed value, and then returns.

Furthermore, in step SB12 after the determination in Step SB11 is YES indicating that the current target fuel pressure is less than the preset lower limit, if any cylinder 2, 2, . . . has already advanced the fuel injection timing, the compensated amount of angle of advance is stored for each cylinder 2. Then, in Step SB13, the fuel pressure sweep flag is cleared (FminΘ0), and the program then returns. In this control flow, after the fuel pressure has been decreased to the preset lower limit, the fuel injection timing is compensated in angle of advance for each cylinder 2 so that even in such a condition all the cylinders 2, 2, . . . can have a good combustion condition. As a result, such a deviation of fuel spray penetration as may be weak relative to the intensity of the tumble T is cancelled thereby surely improving combustion quality for all the cylinders 2, 2, . . . .

As described above, even when the fuel injection pressure is forcibly reduced (pressure reductively changing control) so that the fuel pressure is decreased to the preset lower limit, if the degree of combustion variation of the engine 1 is determined to be smaller than that in the reference condition, then the fuel injection pressure of the injector 18 is in turn increased to a predetermined upper limit, i.e., a preset upper limit, (pressure augmentatively changing control). Specifically, if the determination in Step SB8 is NO indicating that the fuel pressure lower limit sweep flag Fmin is not set, the program proceeds with Step SB14 in the flow of FIG. 20. In Step SB14, it is determined like Step SB9 whether the degree of combustion variation of the engine 1 is more than that in the reference condition.

In this case, a combustion variation is sufficiently small for a period of time during which the fuel injection pressure of the injector 18 in each cylinder 2 returns from the preset lower limit to the reference target fuel pressure. During the period, the determination in Step SB14 is NO and then the program proceeds with Step SB15. In Step SB15, it is determined whether the current target fuel pressure is more than the preset upper limit. This determination is also NO at the outset. In effect, the program proceeds with Step SB16 in which the target fuel pressure is incremented by the predetermined fixed value, and then returns.

Thereafter, such incrementing of the target fuel pressure is repeated until the current target fuel pressure exceeds the above-mentioned reference target fuel pressure. When the current target fuel pressure has exceeded the reference target fuel pressure, in turn the incrementing of the fuel pressure may cause combustion in either one of the cylinders 2, 2, . . . to be intensified than anticipated so that the combustion condition of the engine 1 may be deteriorated over the reference condition. In such a situation, the determination in Step SB14 is YES and the program proceeds with Step SB17. In Step SB17, contrary to Step SB10, the fuel injection timing of the cylinder 2 in deteriorated combustion condition is retarded by a predetermined angle of retard (fixed value).

Namely, if the penetration of fuel spray is increased by forcibly increasing the fuel pressure so that a certain cylinder 2 deteriorates its combustion condition, it can be understood that the penetration of fuel spray in the cylinder 2 of concern has originally been deviated on a more intense side and therefore mixture stratification will be interfered with as shown in FIG. 18B. Accordingly, in such a case, retarding the fuel injection timing provides improved ignitability and combustion quality.

When the augmentatively changing of the fuel pressure and the corresponding compensation of the injection timing by the angle of retard are repeated and the determination in Step SB15 is then YES indicating that the current target fuel pressure is beyond the preset upper limit, the program proceeds with Step SB18 in which the compensated amounts of angle of retard in the cylinders 2, 2, . . . for which the fuel injection timing has already been retarded are stored for each cylinder 2. Subsequently, in Step SB19, the fuel pressure sweep flag is set again (Fmin←1).

In this control flow, after the fuel pressure has been increased to the preset upper limit, the fuel injection timing is compensated in angle of retard for each cylinder 2 so that even in such a condition all the cylinders 2, 2, . . . can have a good combustion condition. As a result, such a deviation of fuel spray penetration as may be intense relative to the intensity of the tumble T is cancelled thereby surely improving combustion quality for all the cylinders 2, 2, . . . .

As described above, the fuel injection pressure of the injector 18 is changed from the preset lower limit to the preset upper limit, and the fuel injection timing is then compensated on an advance side or a retard side for each cylinder 2 so that even in every conditions a combustion variation of the engine 1 can be sufficiently decreased. As a result, even if in every cylinder 2, 2, . . . their penetration of fuel spray is deviated on an intense or weak side relative to the tumble T, these deviations can be eliminated thereby providing suitable mixture stratification.

Then, in Step SB20, the amount of compensation of the injection timing for the entire stratified-charge combustion zone A is obtained based on the compensated amounts of angle of advance for individual cylinders stored in Step SB12 and on the compensated amounts of angle of retard for individual cylinders stored in Step SB18. Specifically, the compensated amounts stored in Steps SB12 and SB18 indicate deviations of fuel spray penetration or the like in idling operating conditions for individual cylinders 2. Therefore, each of these compensated amounts is multiplied by a predetermined factor corresponding to each of the operating conditions (target load Pi and engine revolving speed ne) of the engine 1 in stratified-charge combustion mode so that an amount of compensation (learning value) for a suitable fuel injection timing is calculated for individual operating conditions.

Subsequently, in Step SB21, the learning values are reflected on calculation of the reference fuel injection timing of the injector 18. This can be made by compensating the reference fuel injection timing, which has been read out of the map by the fuel injection timing control means 50a of the ECU 50, using the leaning values. Thereby, the unbalance of fuel spray and tumble T can be substantially eliminated over the entire stratified-charge combustion zone A of the engine 1 thereby providing improved ignitability and combustion quality of the mixture and further improving fuel economy and power output performance of the engine 1. Then, in Step SB22, the learning execution flag Fstdy is cleared (Fstdy←0), and then in Step SB23, the current target fuel pressure is returned to the reference target fuel pressure and the learning compensation control ends.

In the learning compensation control flow shown in FIGS. 19 and 20, Steps SB6 and SB16 constitute a fuel pressure forcibly changing means 50b for forcibly changing the target fuel pressure as the fuel injection pressure of the injector 18 from a reference injection pressure corresponding to operating conditions of the engine 1. Further, the fuel pressure forcibly changing means 50b is arranged to gradually reduce the target fuel pressure to the preset lower limit in effecting a pressure reductively changing control of changing the fuel injection pressure of the injector 18 so that the fuel injection pressure becomes lower than the referential target fuel pressure, and gradually increase the target fuel pressure to the preset upper limit in effecting a pressure augmentatively changing control.

In the learning compensation control flow, Step SB7 constitutes a combustion variation detecting means 50c for calculating the rate of change in crank angular velocity as the degree of combustion variation in the engine 1 when the target fuel pressure is changed by the fuel injection forcibly changing means 50b. Steps SB9 and SB14 constitute a combustion variation determining means 50d for comparing the rate of change in crank angular velocity detected by the combustion variation detecting means 50c with the criterion to determine that the detected degree of combustion variation of the engine 1 is larger than that in the reference condition.

Furthermore, Steps SB10 and SB17 constitute an injection timing compensation means 50e for compensating the fuel injection timing of the injector 18 so that the degree of combustion variation of the engine 1 becomes smaller than that in the reference condition when the combustion variation determining means 50d determines that the degree of combustion variation is larger than that in the reference condition.

Furthermore, Steps SB20 and SB21 constitute a learning control means 50f for obtaining a learning value based on a compensated amount of the fuel injection timing by the injection timing compensation means 50e and reflecting the learning value on the control of the injection timing control means 50a over the reference fuel injection timing.

Engine Stratified-Charge Combustion Operation

Next, description will be made about the stratified-charge combustion operation of the engine 1 according to the present embodiment.

In the stratified-charge combustion zone A of the engine 1, when the piston 5 moves down from the top dead center during such an intake stroke of the cylinder 2 as shown in FIG. 11, an intake air flows into the combustion chamber 6 through a clearance between the valve head of the intake valve 12 in open position and the opening end of the intake port 10 so that a tumble T is generated as shown in the arrow in the figure. In detail, the intake air taken in the combustion chamber 6 through the downward movement of the piston 5 flows into the combustion chamber 6 mainly through portion of the opening end of the intake port 10 closer to the spark plug 16. With further downward movement of the piston 5, the intake air flows downward along the cylinder inner periphery on the exhaust side (left-hand side of the figure), is turned to the intake side (right-hand side of the figure) along the piston 5 crown surface, and then flows upward thereby forming a tumble T longitudinally widely swirling over the entire combustion chamber 6.

Subsequently, the cylinder 2 shifts to the compression stroke. During this stroke, when the piston 5 moves up from the bottom dead center, the volume of the combustion chamber 6 is reduced by the upward movement of the piston 5 and the tumble T is thus pressed in a compact shape. The flow rate of the tumble T is gradually decreased. In this case, also after the middle stage of the compression stroke of the cylinder 2, the combustion chamber space of suitable size and form is left between the pent-roof type combustion chamber 6 ceiling and the cavity 5a of the piston 5 crown surface, and therefore the tumble T is not collapsed but retained up to the middle and later stages of the compression stroke of the cylinder 2. At the time, the partial tumble T flowing along the piston 5 crown surface from exhaust to intake side (from left- to right-hand side of the figure) turns backward near to the injection nozzle of the injector 18 and then flows along the combustion chamber 6 ceiling from intake to exhaust side. Particularly, the partial tumble flowing along the piston 5 crown surface is guided along the cavity 5a of the piston 5 crown surface to flow toward the injection nozzle of the injector 18.

Figure 13:
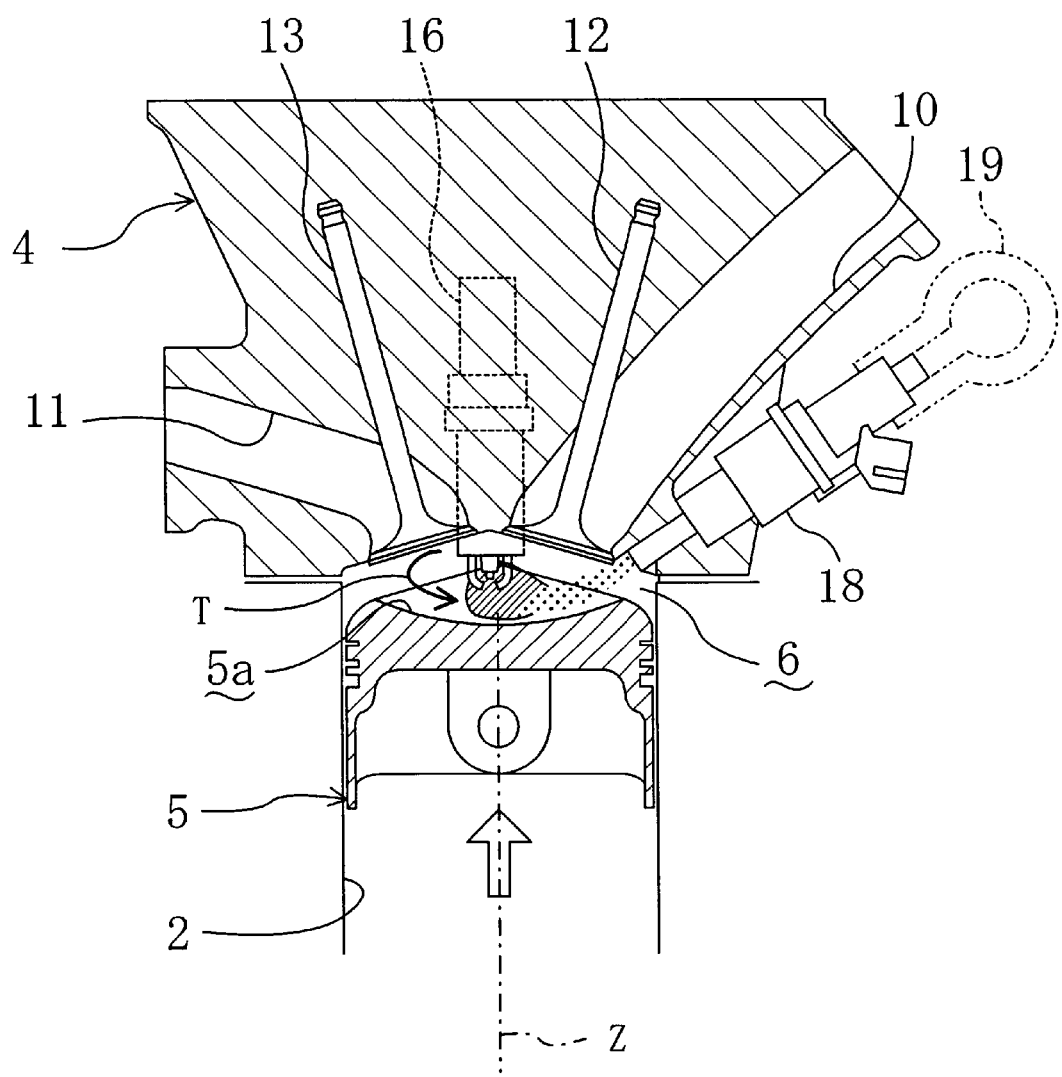
FIG. 13 is a view illustrating how the mixture stays in the vicinity of the spark plug electrode at the ignition timing for the cylinder.

As shown in FIG. 12, when a fuel is injected by the injector 18, the major part of the fuel spray impinges substantially oppositely against intense partial flow of the tumble T flowing along the cavity 5a of the piston 5 crown surface. Thereby, carburetion of fuel droplets and mixture thereof with the ambient air are promoted, and the fuel spray is gradually reduced in speed while advancing to push away the tumble T so that a flammable mixture layer of suitable concentration is formed around the spark plug 16 electrode at the ignition timing for the cylinder 2 as shown in FIG. 13. During the time, squishes flowing from outside of the cavity 5a toward the cylinder center suppress diffusion of the flammable mixture layer. In this state, electricity is conducted to the spark plug 16 so that the flammable mixture layer is ignited.

At the time, the fuel injection pressure of the injector 18 is controlled basically in accordance with the operating conditions of the engine 1 so that the fuel spray penetration is adjusted to accord with the flow rate of the tumble T (see FIG. 16). In addition, in the idling operating conditions of the engine 1, under conditions where the fuel injection pressure of the injector 18 is forcibly changed from the preset lower limit to the preset upper limit and deviations of the fuel spray penetration are amplified in both the preset lower and upper limits, the fuel injection timing is compensated for each cylinder 2 on an advance side or a retard side so that each cylinder 2 can have a good combustion condition.

Accordingly, even if injectors 18 have individual differences, the penetration of fuel spray from the injector 18 in each cylinder 2 is balanced against the flow rate of the tumble T, which provides suitable mixture stratification and further excellent stratified-charge combustion mode. As a result, combustion variations from cylinder to cylinder of the engine 1 can be sufficiently reduced, which prevents the occurrence of an uncomfortable idling vibration.

In addition, in the compensation control, since the fuel pressure of the injector 18 is gradually changed to the predetermined upper or lower limit and the injection timing is gradually compensated by the injection timing compensation means 50e in accordance with the change of the fuel pressure, it can be prevented that during the time an excessive combustion change or a misfire occurs.

Further, since the rate of change in crank angular velocity is detected in the idling operating conditions of the engine 1, the degree of combustion variation can be accurately detected for each cylinder 2 by excluding the effects of angular variations in a vehicle power transmission system and vibrations from a road surface.

Furthermore, in this embodiment, the amount of compensation (learning value) for a suitable injection timing is obtained for individual operating conditions of the stratified-charge combustion zone (A) based on the compensated amount of the fuel injection timing for each cylinder 2 in such compensated idling operating conditions, and the learning value is reflected on compensation for the reference fuel injection timing. Accordingly, the compensation results of the fuel injection timing can be extended over the entire stratified-charge combustion zone (A) in a relatively short learning time. This eliminates the unbalance of fuel spray and tumble in the entire zone (A), thereby providing further improved fuel economy and power output performance of the engine (1).

Consequently, according to the control system A for an in-cylinder direct injection engine 1 according to the present embodiment, even if cylinders 2 of the engine 1 have individual differences in injectors 18 and port shapes, the fuel injection timing can be compensated to eliminate such individual differences. As a result, the unbalance of tumble T and fuel spray penetration is eliminated for each cylinder 2 thereby providing suitable mixture stratification at any stage during the stratified-charge combustion operation of the engine 1 and further improved fuel economy and power output performance of the engine 1.

Other Embodiments

The present invention is not limited to the above embodiment but includes various other embodiments. For example, in the above embodiment, when the engine 1 is in the stratified-charge combustion zone (A), only the fuel injection pressure is controlled while the intake airflow control valve is kept fully closed. However, as shown in FIG. 22, the opening of the intake airflow control valve 34 may be also controlled in the stratified-charge combustion zone (A).

Figure 22A:
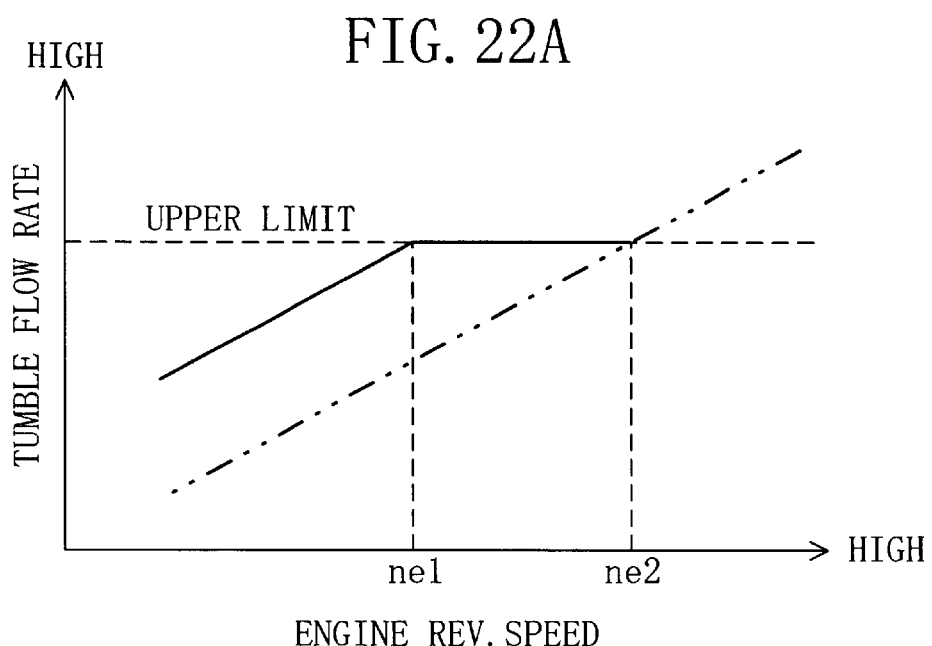
FIGS. 22A and 22B show corresponding graphs of FIG. 16 according to another embodiment of the present invention in which the opening of an intake flow control valve is controlled even in a stratified-charge combustion zone of the engine.
Figure 22B:
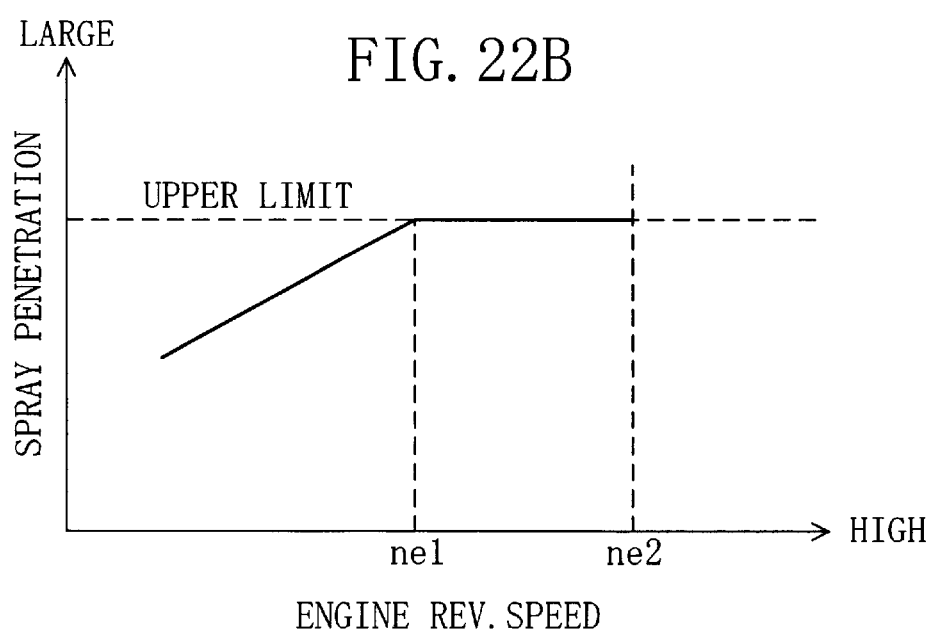

Specifically, as shown in FIG. 22A, when the engine 1 is in the stratified-charge combustion zone and its revolving speed is equal to or smaller than a first set value ne1 (for example, 2500 rpm), the intake airflow control valve 34 is fully closed. In this manner, the flow rate of the tumble can be increased as compared with the case where the intake airflow control valve 34 is open (shown in an imaginary line in the figure). Next, when the engine revolving speed exceeds the first set value ne1, the intake airflow control valve 34 is gradually opened with increase in the engine revolving speed in order that even if the engine revolving speed becomes high, the flow rate of the tumble T is not increased. Then, after the engine revolving speed exceeds a second set value ne2 (for example, 3500 rpm) and the engine 1 shifts to the homogeneous combustion zone, the intake airflow control valve 34 is fully opened to ensure the amount of intake air. And, as shown in FIG. 22B, the fuel spray penetration can be changed in accordance with the change in tumble flow rate.

Further, in the foregoing embodiment, the piston 5 crown surface is formed with a lemon-shaped cavity 5a. However, such a cavity may not necessarily be provided. For example, the piston 5 crown surface may have a flat shape as a whole. Alternatively, a spheric cavity may be provided over the entire piston 5 crown surface.

Figure 23A:
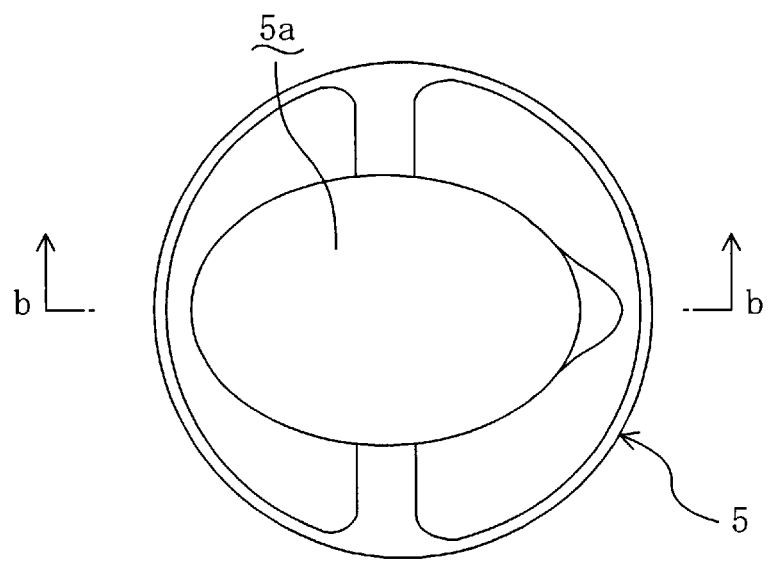
FIG. 23A is an enlarged top view of a piston according to another embodiment in which the bottom face of a cavity formed in a piston crown surface is inclined.
Figure 23B:
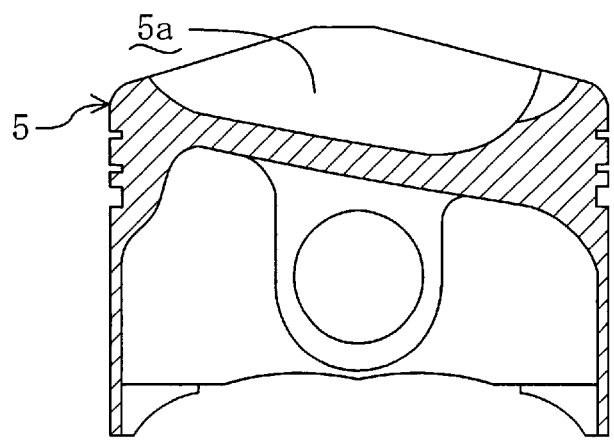
FIG. 23B is a cross-sectional view thereof.

Furthermore, in the case where the piston crown surface is provided with a cavity 5a as shown in the above embodiment, the bottom surface of the cavity 5a is preferably formed to tilt toward the intake side of the combustion chamber 6 (right-hand side in the figure). In the case shown in FIG. 23B, the bottom surface of the cavity 5a is formed so that its portion on the intake side of the combustion chamber 6 is inclined to be deeper than its opposite portion on the exhaust side of the combustion chamber 6. Accordingly, the effects of upward movement of the piston 5 during the compression stroke of the cylinder on the tumble T can be alleviated thereby providing improved retentivity of the tumble T in the combustion chamber 6.

Furthermore, in the above embodiment, the spark plug 16 electrode is located near to the cylinder center line. However, the position of the spark plug 16 electrode is not limited to that position, but it can be located at a position offset on the intake valve side, or the exhaust valve side. It should be noted that in such a case, the mixture must be retained in the vicinity of the spark plug 16 electrode at the ignition timing for the cylinder 2. Therefore, it is necessary to change the trade-off level between the flow rate of the tumble T and fuel spray penetration and the relationship between the ignition timing and the fuel injection timing in accordance with the position of the spark plug 16 electrode.

As described above, the control system for an in-cylinder direct injection engine of the present invention can eliminate the unbalance of fuel spray and in-cylinder airflow which will be induced from individual differences between injectors thereby stably providing suitable mixture stratification.

Therefore, the control system is effective to improvement in fuel consumption ratio and purification of exhaust gas when used as a power plant and contributes to reduction in vibrations and noises.

What is claimed is:

1. A control system for an in-cylinder direct injection engine which comprises: a fuel injection valve for directly injecting a fuel into a combustion chamber in a cylinder of an engine; and a tumble generating means for generating a tumble in the combustion chamber, in which the fuel is injected against the tumble in the combustion chamber by the fuel injection valve during stratified-charge combustion operation of the engine so that a flammable mixture stays in the vicinity of a spark plug at the ignition timing for the cylinder, the control system further comprising:

- a fuel pressure control means for controlling the fuel injection pressure of the fuel injection valve;
- a fuel pressure forcibly changing means for forcibly changing the fuel injection pressure to be controlled by the fuel pressure control means from a reference injection pressure corresponding to operating conditions of the engine;
- a combustion variation detecting means for detecting the degree of combustion variation in the engine when the fuel injection pressure has been changed by the fuel injection forcibly changing means; and
- an injection timing compensation means for compensating the fuel injection timing of the fuel injection valve so that the degree of combustion variation in the engine detected by the combustion variation detecting means becomes smaller than that in a preset reference condition.

2. The control system of claim 1, wherein a combustion variation determining means is provided for comparing the degree of combustion variation of the engine detected by the combustion variation detecting means with that in the reference condition to determine that the detected degree of combustion variation is larger than that in the reference condition, and the injection timing compensation means is adapted to compensate the fuel injection timing when the combustion variation determining means determines that the detected degree of combustion variation is larger than that in the reference condition.

3. The control system of claim 1, wherein the engine is a multi-cylinder engine having a plurality of cylinders, and the injection timing compensation means is adapted to compensate the fuel injection timing for each cylinder of the engine.

4. The control system of claim 2, wherein the fuel pressure forcibly changing means effects a pressure reductively changing control of changing the fuel injection pressure of the fuel injection valve so that the fuel injection pressure becomes lower than a reference injection pressure and a pressure augmentatively changing control of changing the fuel injection pressure so that the fuel injection pressure becomes higher than the reference injection pressure, and the injection timing compensation means compensates the fuel injection timing of the fuel injection valve to the advance side if the degree of combustion variation of the engine has become larger than that in the reference condition as the result of a pressure reductively changing control of the fuel pressure forcibly changing means while compensating the fuel injection timing to the retard side if the degree of combustion variation of the engine becomes larger than that in the reference condition as the result of a pressure augmentatively changing control of the fuel pressure forcibly changing means.

5. The control system of claim 4, wherein the fuel pressure forcibly changing means is arranged to effect a pressure reductively changing control to gradually reduce the fuel injection pressure of the fuel injection valve to a predetermined lower limit and effect a pressure augmentatively changing control to gradually increase the fuel injection pressure to a predetermined upper limit.

6. The control system of claim 5, wherein when the combustion variation determining means determines that the detected degree of combustion variation of the engine is smaller than that in the reference condition after the fuel pressure forcibly changing means has effected either one of the pressure reductively changing control and pressure augumentatively changing control, the fuel pressure forcibly changing means effects the other.

7. The control system of claim 1, wherein the fuel pressure forcibly changing means and the injection timing compensation means are arranged to effect the changing of the fuel injection pressure of the fuel injection valve and the compensation for the fuel injection timing, respectively, in idling operating conditions of the engine.

8. The control system of claim 1, further comprises:

an injection timing control means for controlling the fuel injection timing of the fuel injection valve in accordance with the operating conditions of the engine, and a learning control means for obtaining a learning value based on a compensated amount of the fuel injection timing by the injection timing compensation means and reflecting the learning value on the control of the injection timing control means over the fuel injection timing.

9. An in-cylinder direct injection engine system comprising:

- a fuel injection valve for directly injecting a fuel into a combustion chamber in a cylinder of an engine;
- an intake port capable of generating a tumble flow in the combustion chamber;
- a regulator for regulating the fuel pressure of the fuel to be supplied to the fuel injection valve;
- a revolving speed sensor for detecting the revolving speed of the engine;
- a crank angle sensor for detecting the rotational angle of a crank shaft;
- a fuel pressure sensor for detecting the pressure of the fuel being supplied to the fuel injection valve; and
- a control unit for controlling the fuel injection timing and fuel pressure of the fuel injection valve based on a signal from at least one of the revolving speed sensor, the crank angle sensor and the fuel pressure sensor, wherein the control unit is adapted to set based on at least the engine revolving speed a reference target value for control on the fuel pressure to be regulated by the regulator, set based on at least the engine revolving speed a reference target value for control on the fuel injection timing of the fuel injection valve, change the setting of the reference target value for control on the fuel pressure to increase or decrease the target value followed by controlling the regulator so that the value detected by the fuel pressure sensor reaches the changed target value, retard the fuel injection timing of the fuel injection valve behind the reference target value for control on the fuel injection timing if the rate of change of values detected by the crank angle sensor becomes larger than a preset reference value as the result of an augmentative setting of the target value for control on the fuel pressure, and advance the fuel injection timing of the fuel injection valve ahead of the reference target value for control on the fuel injection timing if the rate of change of values detected by the crank angle sensor becomes larger than the preset reference value as the result of a reductive setting of the target value for control on the fuel pressure.

* * * * *